US012475968B2

(12) United States Patent
Fu et al.

(10) Patent No.: US 12,475,968 B2
(45) Date of Patent: Nov. 18, 2025

(54) SELF-LEARNING BUILT-IN SELF-TEST (BIST) FOR LEAK DETECTION IN NON-VOLATILE MEMORY

(71) Applicant: Sandisk Technologies, Inc., Milpitas, CA (US)

(72) Inventors: Cuili Fu, Shanghai (CN); Wenkai Liu, Shanghai (CN); Xiaohu Liu, Shanghai (CN); Liang Li, Shanghai (CN)

(73) Assignee: Sandisk Technologies, Inc., Milpitas, CA (US)

( * ) Notice: Subject to any disclaimer, the term of this patent is extended or adjusted under 35 U.S.C. 154(b) by 129 days.

(21) Appl. No.: 18/594,800

(22) Filed: Mar. 4, 2024

(65) Prior Publication Data

US 2025/0279151 A1 Sep. 4, 2025

(51) Int. Cl.
*G11C 29/50* (2006.01)
*G11C 16/04* (2006.01)
*H01L 25/065* (2023.01)

(52) U.S. Cl.
CPC .......... *G11C 29/50* (2013.01); *G11C 16/0483* (2013.01); *G11C 2029/5006* (2013.01); *H01L 25/0657* (2013.01); *H01L 2225/06562* (2013.01)

(58) Field of Classification Search
CPC ................ G11C 29/50; G11C 16/0483; G11C 2029/5006; H01L 25/0657; H01L 2225/06562
USPC ....................................... 365/185.11, 185.24
See application file for complete search history.

(56) References Cited

U.S. PATENT DOCUMENTS

| 8,432,732 | B2 | 4/2013 | Li et al. |
| 8,514,630 | B2 | 8/2013 | Huynh et al. |
| 9,240,249 | B1* | 1/2016 | Sabde .................... G11C 29/06 |
| 9,905,307 | B1 | 2/2018 | Ghai et al. |
| 10,008,276 | B2 | 6/2018 | Huynh et al. |
| 11,404,138 | B2 | 8/2022 | Lakshminarayana Addagalla et al. |
| 2004/0039535 | A1* | 2/2004 | Barth, Jr. ............. G11C 29/025 702/57 |
| 2009/0237103 | A1* | 9/2009 | Ellis-Monaghan ..... H01L 22/34 703/1 |
| 2011/0063937 | A1* | 3/2011 | Eid ........................ G11C 5/147 327/512 |
| 2013/0229868 | A1* | 9/2013 | Koh ....................... G11C 16/10 365/185.03 |
| 2013/0272074 | A1* | 10/2013 | Tanaka ................... G11C 16/28 365/189.07 |

(Continued)

*Primary Examiner* — Michael T Tran
(74) *Attorney, Agent, or Firm* — Pearl Cohen Zedek Latzer Baratz LLP

(57) ABSTRACT

In a word line leakage detection process in a NAND or other non-volatile memory device, to determine leaky blocks of a memory device, a reference value for block is determined by comparing the current drawn by the peripheral circuitry of the block with a sequence of comparison current values, corresponding to a range of digital values, while the peripheral circuit is not connected to the block. The current drawn when the peripheral circuitry is connected to the block is then determined, again by comparison with a sequence of comparison values, but of a reduced range of digital values, running from an offset above the reference value to an offset below the reference value. To further reduce test times, the same reference value is used for a group of blocks, such as groups of blocks that share a set of supply lines.

20 Claims, 26 Drawing Sheets

(56) References Cited

U.S. PATENT DOCUMENTS

| | | | |
|---|---|---|---|
| 2015/0169382 A1* | 6/2015 | Anderson | G06F 9/5066 |
| | | | 718/104 |
| 2016/0254060 A1* | 9/2016 | Pi | G11C 16/24 |
| | | | 365/185.21 |
| 2021/0019608 A1* | 1/2021 | Tran | G11C 11/54 |
| 2021/0020255 A1* | 1/2021 | Tran | G11C 16/26 |
| 2021/0398602 A1* | 12/2021 | Lakshminarayana Addagalla | |
| | | | G11C 16/0483 |
| 2022/0187365 A1* | 6/2022 | Song | G11C 16/08 |

\* cited by examiner

Figure 4C
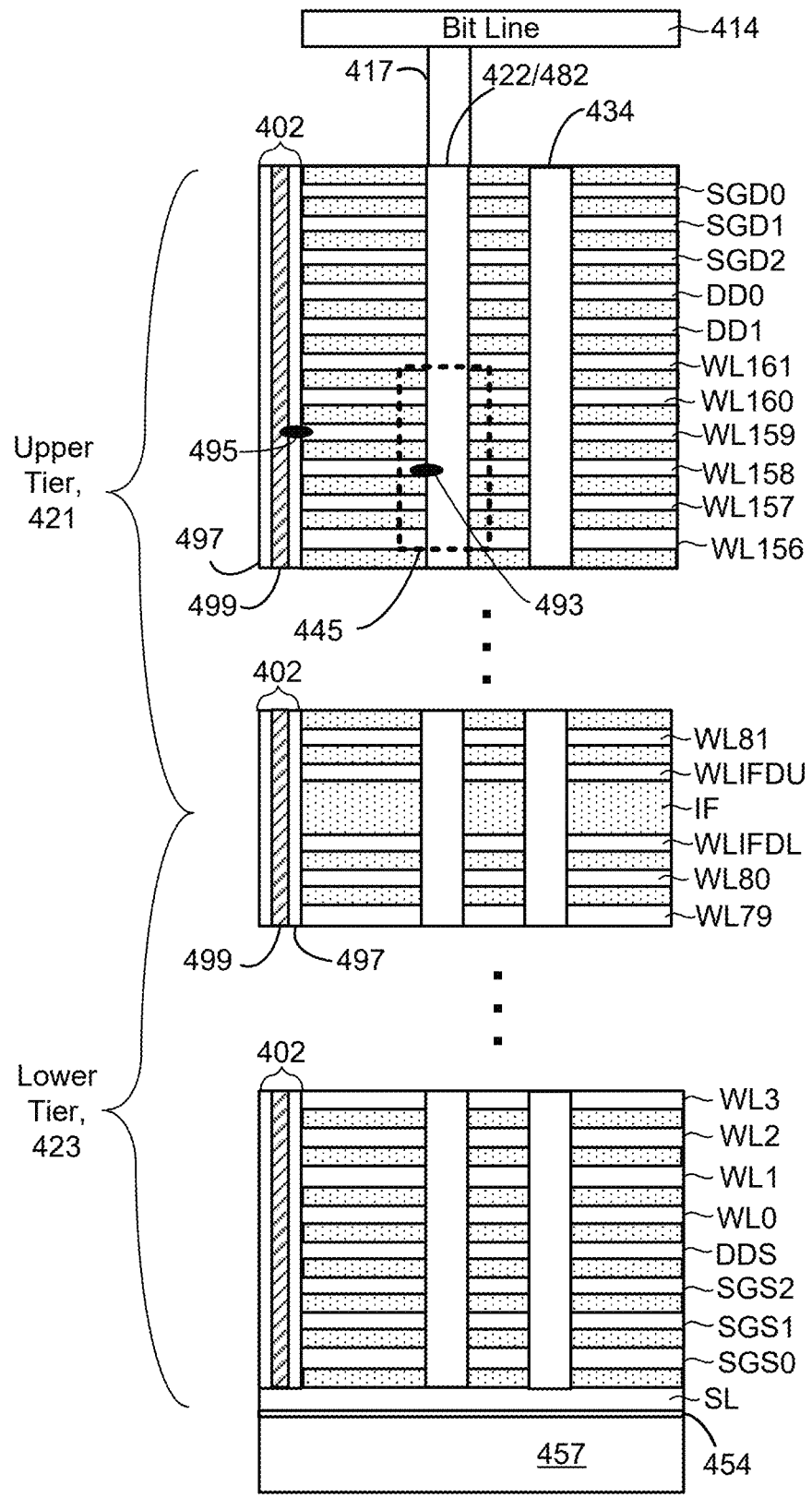
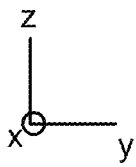

| BL | VSS (0V) |
| SGD | Vsgd |
| DD | Vpass |
| WL81 to WL161 | Vpgmu |
| WLIFDU | Vpass |
| WLIFDL | Vpass |
| WL0 to WL80 | Vpgmu |
| DS | Vpass |
| SGS | Vsgs |
| SL | VSS (0V) |

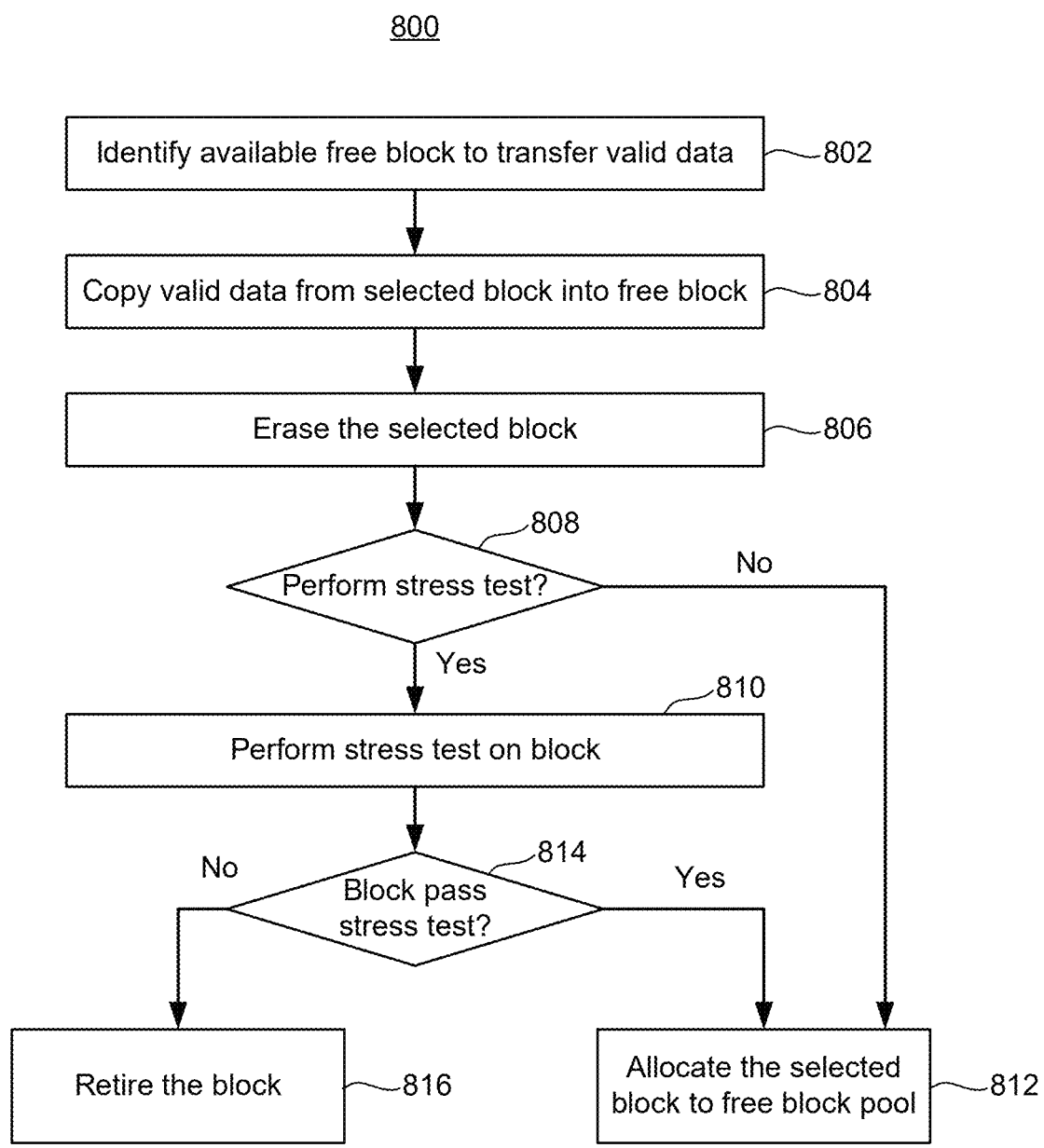

Figure 19

| BLK | REF/DET | Register |
|---|---|---|
| 0x0 | REF | REF DAC |
| 0x0 | DET | DET DAC |
| 0x10 | DET | DET DAC |
| ... | ... | ... |
| 0xC70 | DET | DET DAC |
| 0x1 | REF | REF DAC |
| 0x11 | DET | DET DAC |
| ... | ... | ... |
| 0xC71 | DET | DET DAC |
| 0xF | REF | REF DAC |
| 0x1F | DET | DET DAC |
| ... | ... | ... |
| 0xC7F | DET | DET DAC |

Figure 18

| BLK | REF/DET | Register |
|---|---|---|
| 0x0 | REF | REF DAC |
| 0x0 | DET | DET DAC |
| 0x1 | REF | REF DAC |
| 0x1 | DET | DET DAC |
| ... | ... | ... |
| 0xF | REF | REF DAC |
| 0xF | DET | DET DAC |
| 0x10 | REF | REF DAC |
| 0x10 | DET | DET DAC |
| 0x11 | REF | REF DAC |
| 0x11 | DET | DET DAC |
| ... | ... | ... |
| 0x1F | REF | REF DAC |
| 0x1F | DET | DET DAC |
| 0xC70 | REF | REF DAC |
| 0xC70 | DET | DET DAC |
| 0xC71 | REF | REF DAC |
| 0xC71 | DET | DET DAC |
| ... | ... | ... |
| 0xC7F | REF | REF DAC |
| 0xC7F | DET | DET DAC |

SELF-LEARNING BUILT-IN SELF-TEST (BIST) FOR LEAK DETECTION IN NON-VOLATILE MEMORY

BACKGROUND

The present disclosure relates to non-volatile memory.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery).

A memory structure in the memory system typically contains many memory cells and various control lines. The memory structure may be three-dimensional. One type of three-dimensional structure has non-volatile memory cells arranged as vertical NAND strings. The memory structure may be arranged into units that are commonly referred to as blocks. For example, a block in a NAND memory system contains many NAND strings. A NAND string contains memory cell transistors connected in series, a drain side select gate at one end, and a source side select gate at the other end. Each NAND string is associated with a bit line. The block typically has many word lines that provide voltages to the control gates of the memory cell transistors. In some architectures, each word line connects to the control gate of one memory cell on each respective NAND string in the block.

The non-volatile memory cells may be programmed to store data. Typically, the memory cells are programmed to a number of data states. Using two data states to store a single bit per cell is referred to herein as SLC programming. Using a greater number of data states allows for more bits to be stored per memory cell. Using additional data states to store two or more bits per cell is referred to herein as MLC programming. For example, four data states may be used to store two bits per memory cell, eight data states may be used in order to store three bits per memory cell, 16 data states may be used to store four bits per memory cell, etc. Some memory cells may be programmed to a data state by storing charge in the memory cell. For example, the threshold voltage (Vt) of a NAND memory cell can be set to a target Vt by programming charge into a charge storage region such as a charge trapping layer. The amount of charge stored in the charge trapping layer establishes the Vt of the memory cell.

During a program operation a series of program voltage pulses are applied to the control gates of the memory cells. Each voltage pulse may be stepped up in magnitude from a previous program pulse by a step size in a process referred to as incremental step pulse programming. Each program voltage may be followed by a verify operation to determine if the respective memory cells have been programmed to the desired memory state. Thus, the program operation may include a number of program/verify loops. The word line that is connected to the memory cells being verified is referred to herein as the "selected word line." The remaining word lines connected to other memory cells on the NAND strings are referred to herein as "unselected word lines."

Following manufacturing defects may exist in the memory structure. For example, there could be a short circuit between a word line and a NAND string. There could be a short circuit between a word line and conductive line such as a source line. Such defects can result in dysfunction of memory operations such as erase, program, and/or read. Such defects can potentially result in data loss. Therefore, the memory structure is typically tested after manufacture to detect such defects. Regions of the memory structure having a defect may be retired. For example, a block of memory cells that contains a defect may be marked as a bad block such that it is not used in the field.

Normal memory operations in the field create a small amount of stress on the memory structure. Over time it is possible that the cumulative stress from many memory operations can create a defect. Herein the term "grown bad block" refers to a block of memory cells that develop a defect in the field. Some memory systems will test for and retire grown bad blocks. For example, some systems may test for defects during a program operation. However, testing for defects during a program operation may impact performance.

BRIEF DESCRIPTION OF THE DRAWINGS

Like-numbered elements refer to common components in the different figures.

FIG. 4C depicts an embodiment of a stack showing a cross-sectional view along line AA of FIG. 4B.

FIG. 8 is a flowchart of one embodiment of a process of detecting grown bad blocks in a non-volatile storage system.

FIGS. 18 and 19 present a test algorithm comparison between a traditional BIST leak detection of FIGS. 13A and 13B and the embodiment of FIGS. 14A and 14B.

DETAILED DESCRIPTION

Technology is disclosed herein for detecting short circuits involving word lines in a non-volatile storage system. A word line that is involved in a short circuit (or more briefly "short") is referred to herein as a "leaky word line," which refers to current leakage that occurs as a result of the short circuit. The short circuit may include, but is not limited to, a word line to NAND channel short, a word line to conductive line short, and/or a word line to source line short. Testing for word line leakage can be performed as part of a set of tests performed on a memory die before the device is shipped to determine defects at the level of individual word lines, individual blocks, or at the level of the die, so that defective elements can be mapped out or even the whole die determined as defective. Word line leakage can also be detected during a built-in self-test (BIST) once a device is in use.

Word line leak detection can be performed by stressing an array by applying a high voltage, such as a program voltage, to a set of stress selected word lines while other parts of the array are set to a low voltage. For example, to test for word line to memory hole leakage in a 3D NAND memory, all of the word lines of a block can be biased to the high stress voltage, while the source and bit lines are biased to ground. After stressing the array, the current drawn by the stress selected word lines can then be monitored to determine leakage. To fully test a memory device such as a NAND memory, multiple leakage tests are performed on each block, which can be an expensive and time consuming process. Consequently, there would be a benefit to be able to fully test a memory device in less time. The following presents techniques accelerate test processes for leakage detection.

More specifically, to determine leaky blocks of a memory device, a reference value for a block is determined by comparing the current drawn by the peripheral circuitry of the block with a sequence of comparison current values, corresponding to a range of digital values, while the peripheral circuit is not connected to the block. The current drawn when the peripheral circuitry is connected to the block is then determined, again by comparison with a sequence of comparison values, but of a reduced range of digital values, running from an offset above the reference value to an offset below the reference value. To further reduce test times, the same reference value is used for a group of blocks, such as groups of blocks that share a set of supply lines.

Figure 1:
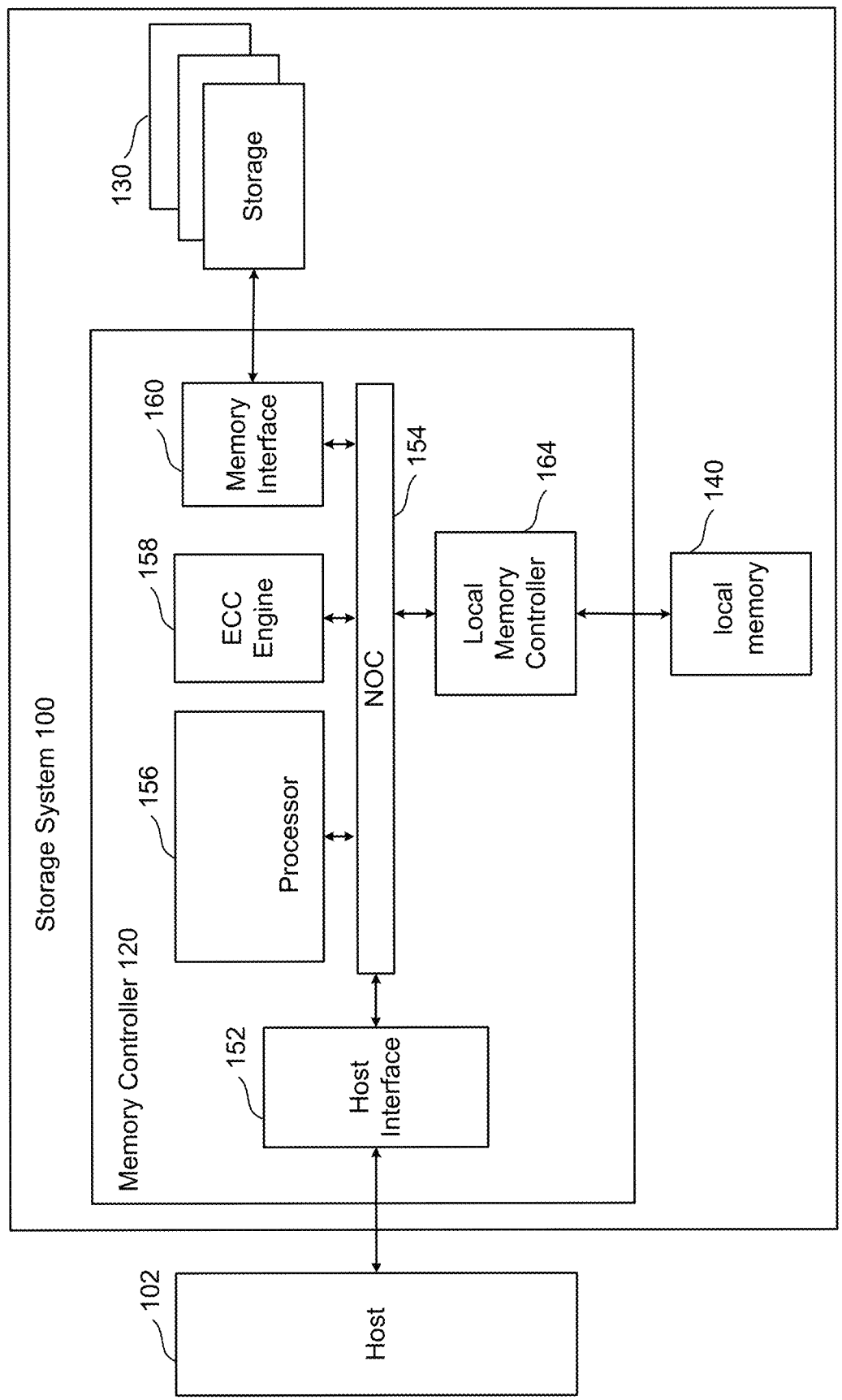
FIG. 1 is a block diagram depicting one embodiment of a storage system.

FIG. 1 is a block diagram of one embodiment of a storage system 100 that implements the technology described herein. In one embodiment, storage system 100 is a solid state drive ("SSD"). Storage system 100 can also be a memory card, USB drive or other type of storage system. The proposed technology is not limited to any one type of storage system. Storage system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, storage system 100. In other embodiments, storage system 100 is embedded within host 102.

The components of storage system 100 depicted in FIG. 1 are electrical circuits. Storage system 100 includes a memory controller 120 (or storage controller) connected to non-volatile storage 130 and local high speed memory 140 (e.g., DRAM, SRAM, MRAM). Local memory 140 is non-transitory memory, which may include volatile memory or non-volatile memory. Local high speed memory 140 is used by memory controller 120 to perform certain operations. For example, local high speed memory 140 may store logical to physical address translation tables ("L2P tables").

Memory controller 120 comprises a host interface 152 that is connected to and in communication with host 102. In one embodiment, host interface 152 implements an NVM Express (NVMe) over PCI Express (PCIe). Other interfaces can also be used, such as SCSI, SATA, etc. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus. Connected to and in communication with NOC 154 is processor 156, ECC engine 158, memory interface 160, and local memory controller 164. Local memory controller 164 is used to operate and communicate with local high speed memory 140 (e.g., DRAM, SRAM, MRAM).

ECC engine 158 performs error correction services. For example, ECC engine 158 performs data encoding and decoding. In one embodiment, ECC engine 158 is an electrical circuit programmed by software. For example, ECC engine 158 can be a processor that can be programmed. In other embodiments, ECC engine 158 is a custom and dedicated hardware circuit without any software. In another embodiment, the function of ECC engine 158 is implemented by processor 156.

Processor 156 performs the various controller memory operations, such as programming, erasing, reading, and memory management processes. In one embodiment, processor 156 is programmed by firmware. In other embodiments, processor 156 is a custom and dedicated hardware circuit without any software. Processor 156 also implements a translation module, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory die. To implement this system, memory controller 120 (e.g., the translation module) performs address translation between the logical addresses used by the host and the physical addresses used by the memory die. One example implementation is to maintain tables (i.e. the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in a storage 130 and a subset of the L2P tables are cached (L2P cache) in the local high speed memory 140.

Memory interface 160 communicates with non-volatile storage 130. In one embodiment, memory interface provides a Toggle Mode interface. Other interfaces can also be used. In some example implementations, memory interface 160 (or another portion of controller 120) implements a scheduler and buffer for transmitting data to and receiving data from one or more memory die.

Figure 2A:
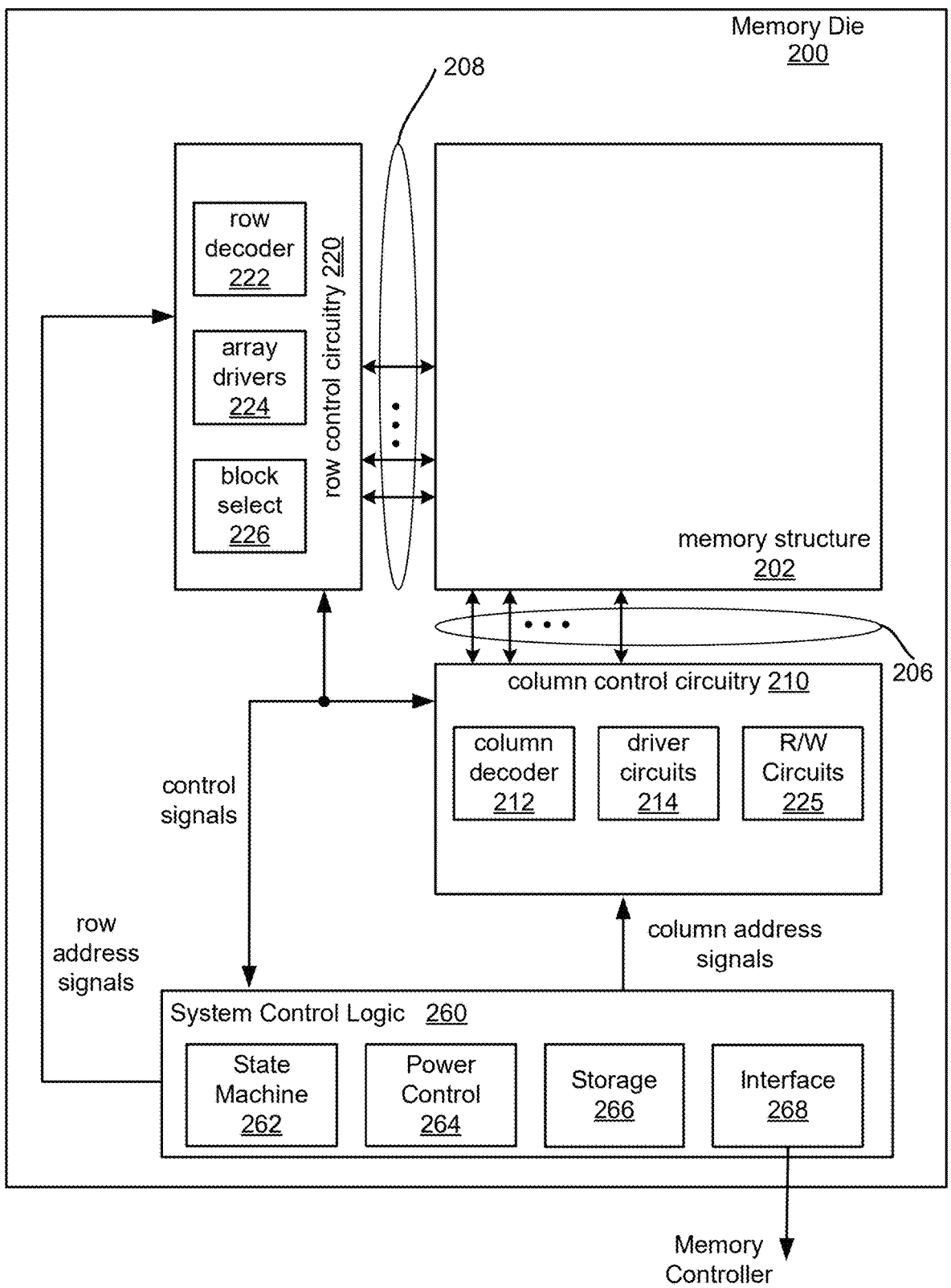
FIG. 2A is a block diagram of one embodiment of a memory die.

In one embodiment, non-volatile storage 130 comprises one or more memory dies. FIG. 2A is a functional block diagram of one embodiment of a memory die 200 that comprises non-volatile storage 130. Each of the one or more memory dies of non-volatile storage 130 can be implemented as memory die 200 of FIG. 2A. The components depicted in FIG. 2A are electrical circuits. Memory die 200 includes a memory structure 202 (e.g., memory array) that can comprise non-volatile memory cells (also referred to as non-volatile storage cells), as described in more detail below. The array terminal lines of memory structure 202 include the various layer(s) of word lines organized as rows, and the various layer(s) of bit lines organized as columns. However, other orientations can also be implemented. Memory die 200 includes row control circuitry 220, whose outputs are connected to respective word lines of the memory structure 202. Row control circuitry 220 receives a group of M row address signals and one or more various control signals from System Control Logic circuit 260, and typically may include such circuits as row decoders 222, array drivers 224, and block select circuitry 226 for both reading and writing (programming) operations. Row control circuitry 220 may also include read/write circuitry. Memory die 200 also includes column control circuitry 210 including read/write circuits 225. The read/write circuits 225 may contain sense amplifiers and data latches. The sense amplifier(s) input/outputs are connected to respective bit lines of the memory structure 202. Although only a single block is shown for structure 202, a memory die can include multiple arrays that can be individually accessed. Column control circuitry 210 receives a group of N column address signals and one or more various control signals from System Control Logic 260, and typically may include such circuits as column decoders 212, array terminal receivers or driver circuits 214, as well as read/write circuitry 225, and I/O multiplexers.

System control logic 260 receives data and commands from memory controller 120 and provides output data and status to the host. In some embodiments, the system control logic 260 (which comprises one or more electrical circuits) includes state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor, either on or off the memory chip. System control logic 260 can also include a power control module 264 that controls the power and voltages supplied to the rows and columns of the memory structure 202 during memory operations. System control logic 260 includes storage 266 (e.g., RAM, registers, latches, etc.), which may be used to store parameters for operating the memory structure 202.

Commands and data are transferred between memory controller 120 and memory die 200 via memory controller interface 268 (also referred to as a "communication interface"). Memory controller interface 268 is an electrical interface for communicating with memory controller 120. Examples of memory controller interface 268 include a Toggle Mode Interface and an Open NAND Flash Interface (ONFI). Other I/O interfaces can also be used.

In some embodiments, all the elements of memory die 200, including the system control logic 260, can be formed as part of a single die. In other embodiments, some or all of the system control logic 260 can be formed on a different die than the die that contains the memory structure 202.

In one embodiment, memory structure 202 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 202 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 202 is not limited to the examples above. Many different types of memory array architectures or memory technologies can be used to form memory structure 202. No particular non-volatile memory technology is required for purposes of the new claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of current, voltage, light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts: (1) memory structure 202 and (2) peripheral circuitry, which includes all of the other components depicted in FIG. 2A. An important characteristic of a memory circuit is its capacity, which can be increased by increasing the area of the memory die of storage system 100 that is given over to the memory structure 202; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die for the storage system 100 is the amount of area to devote to the memory structure 202 and the amount of area to devote to the peripheral circuitry.

Another area in which the memory structure 202 and the peripheral circuitry are often at odds is in the processing involved in forming these regions, since these regions often involve differing processing technologies and the trade-off in having differing technologies on a single die. For example, when the memory structure 202 is NAND flash, this is an NMOS structure, while the peripheral circuitry is often CMOS based. For example, elements such as sense amplifier circuits, charge pumps, logic elements in a state machine, and other peripheral circuitry in system control logic 260 often employ PMOS devices. Processing operations for manufacturing a CMOS die will differ in many aspects from the processing operations optimized for an NMOS flash NAND memory or other memory cell technologies. Three-dimensional NAND structures (see, for example, FIG. 4) in particular may benefit from specialized processing operations.

To improve upon these limitations, embodiments described below can separate the elements of FIG. 2A onto separately formed dies that are then bonded together. More specifically, the memory structure 202 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more dies, such as two memory dies and one control die, for example.

Figure 2B:
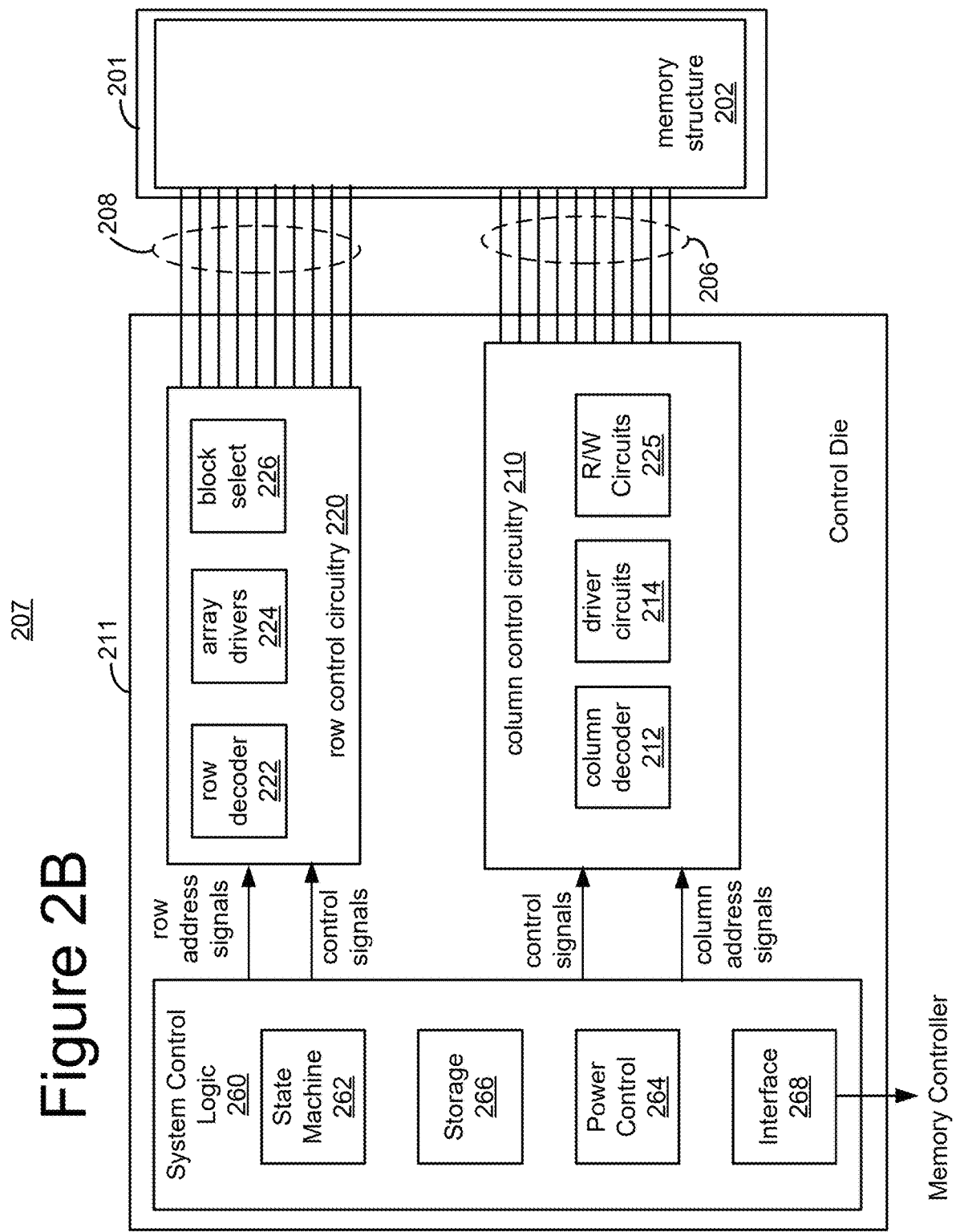
FIG. 2B is a block diagram of one embodiment of an integrated memory assembly.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 207. One or more integrated memory assemblies 207 may be used to implement the non-volatile storage 130 of storage system 100. The integrated memory assembly 207 includes two types of semiconductor dies (or more succinctly, "die"). Memory structure die 201 includes memory structure 202. Memory structure 202 includes non-volatile memory cells. Control die 211 includes control circuitry 260, 210, and 220 (as described above). In some embodiments, control die 211 is configured to connect to the memory structure 202 in the memory structure die 201. In some embodiments, the memory structure die 201 and the control die 211 are bonded together.

FIG. 2B shows an example of the peripheral circuitry, including control circuits, formed in a peripheral circuit or control die 211 coupled to memory structure 202 formed in memory structure die 201. Common components are labelled similarly to FIG. 2A. System control logic 260, row control circuitry 220, and column control circuitry 210 are located in control die 211. In some embodiments, all or a portion of the column control circuitry 210 and all or a portion of the row control circuitry 220 are located on the memory structure die 201. In some embodiments, some of the circuitry in the system control logic 260 is located on the on the memory structure die 201.

System control logic 260, row control circuitry 220, and column control circuitry 210 may be formed by a common process (e.g., CMOS process), so that adding elements and functionalities, such as ECC, more typically found on a memory controller 120 may require few or no additional process steps (i.e., the same process steps used to fabricate controller 120 may also be used to fabricate system control logic 260, row control circuitry 220, and column control circuitry 210). Thus, while moving such circuits from a die such as memory structure die 201 may reduce the number of steps needed to fabricate such a die, adding such circuits to a die such as control die 211 may not require many additional process steps. The control die 211 could also be referred to as a CMOS die, due to the use of CMOS technology to implement some or all of control circuitry 260, 210, 220.

FIG. 2B shows column control circuitry 210 including read/write circuits 225 on the control die 211 coupled to memory structure 202 on the memory structure die 201 through electrical paths 206. For example, electrical paths 206 may provide electrical connection between column decoder 212, driver circuitry 214, and R/W circuits 225 and bit lines of memory structure 202. Electrical paths may extend from column control circuitry 210 in control die 211 through pads on control die 211 that are bonded to corresponding pads of the memory structure die 201, which are connected to bit lines of memory structure 202. Each bit line of memory structure 202 may have a corresponding electrical path in electrical paths 206, including a pair of bond pads, which connects to column control circuitry 210. Similarly, row control circuitry 220, including row decoder 222, array drivers 224, and block select 226 are coupled to memory structure 202 through electrical paths 208. Each electrical path 208 may correspond to a word line, dummy word line, or select gate line. Additional electrical paths may also be provided between control die 211 and memory structure die 201.

For purposes of this document, the phrases "a control circuit" or "one or more control circuits" can include any one of or any combination of memory controller 120, state machine 262, power control 264, all or a portion of system control logic 260, all or a portion of row control circuitry 220, all or a portion of column control circuitry 210, read/write circuits 225, sense amps, a microcontroller, a microprocessor, and/or other similar functioned circuits. A control circuit can include hardware only or a combination of hardware and software (including firmware). For example, a controller programmed by firmware to perform the functions described herein is one example of a control circuit. A control circuit can include a processor, FPGA, ASIC, integrated circuit, or other type of circuit.

For purposes of this document, the term "apparatus" can include, but is not limited to, one or more of, storage system 100, memory controller 120, storage 130, memory die 200, integrated memory assembly 207, and/or control die 211.

Figure 3A:
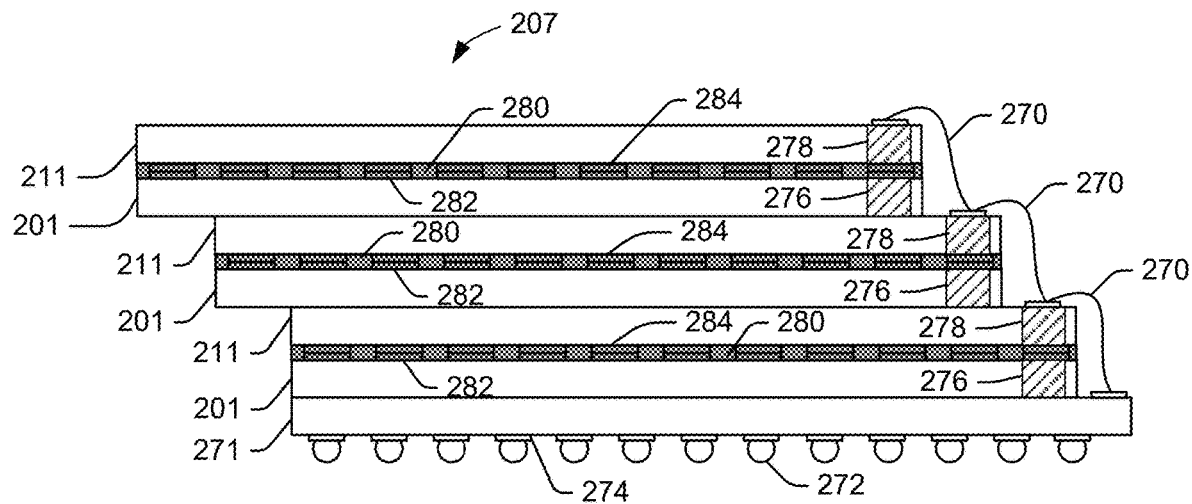
FIGS. 3A and 3B depict different embodiments of integrated memory assemblies.

In some embodiments, there is more than one control die 211 and more than one memory structure die 201 in an integrated memory assembly 207. In some embodiments, the integrated memory assembly 207 includes a stack of multiple control dies 211 and multiple memory structure dies 201. FIG. 3A depicts a side view of an embodiment of an integrated memory assembly 207 stacked on a substrate 271 (e.g., a stack comprising control die 211 and memory structure die). The integrated memory assembly 207 has three control dies 211 and three memory structure dies 201. In some embodiments, there are more than three memory structure dies 201 and more than three control dies 211. In FIG. 3A there are an equal number of memory structure dies 201 and control dies 211; however, in one embodiment, there are more memory structure dies 201 than control dies 211. For example, one control die 211 could control multiple memory structure dies 201.

Each control die 211 is affixed (e.g., bonded) to at least one of the memory structure die 201. Some of the bond pads 282/284 are depicted. There may be many more bond pads. A space between two die 201, 211 that are bonded together is filled with a solid layer 280, which may be formed from epoxy or other resin or polymer. This solid layer 280 protects the electrical connections between the die 201, 211, and further secures the die together. Various materials may be used as solid layer 280, but in embodiments, it may be Hysol epoxy resin from Henkel Corp., having offices in California, USA.

The integrated memory assembly 207 may for example be stacked with a stepped offset, leaving the bond pads at each level uncovered and accessible from above. Wire bonds 270 connected to the bond pads connect the control die 211 to the substrate 271. A number of such wire bonds may be formed across the width of each control die 211 (i.e., into the page of FIG. 3A).

A memory die through silicon via (TSV) 276 may be used to route signals through a memory structure die 201. A control die through silicon via (TSV) 278 may be used to route signals through a control die 211. The TSVs 276, 278 may be formed before, during or after formation of the integrated circuits in the semiconductor dies 201, 211. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package. The solder balls 272 may form a part of the interface between integrated memory assembly 207 and memory controller 120.

Figure 3B:
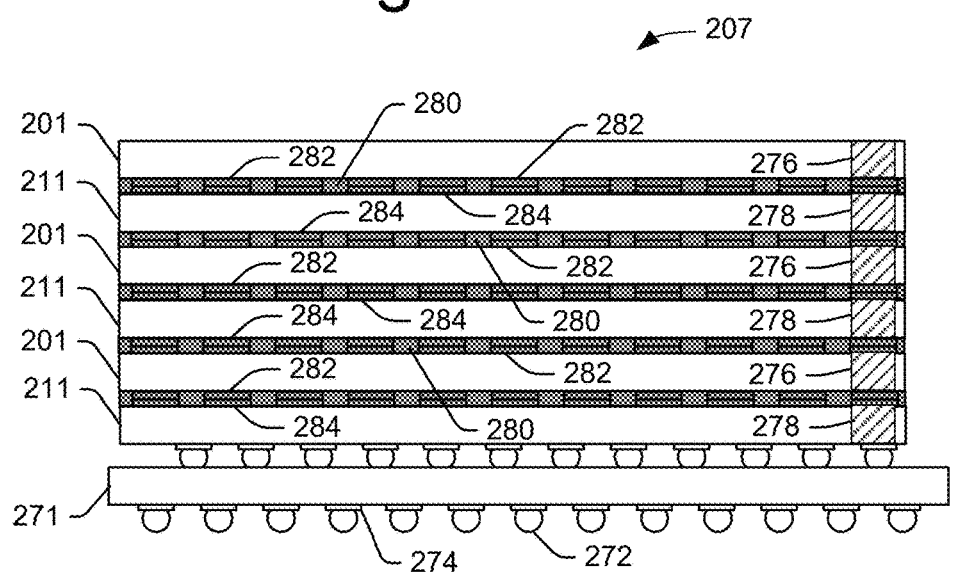

FIG. 3B depicts a side view of another embodiment of an integrated memory assembly 207 stacked on a substrate 271. The integrated memory assembly 207 of FIG. 3B has three control dies 211 and three memory structure dies 201. In some embodiments, there are many more than three memory structure dies 201 and many more than three control dies 211. In this example, each control die 211 is bonded to at least one memory structure die 201. Optionally, a control die 211 may be bonded to two or more memory structure dies 201.

Some of the bond pads 282, 284 are depicted. There may be many more bond pads. A space between two dies 201, 211 that are bonded together is filled with a solid layer 280, which may be formed from epoxy or other resin or polymer. In contrast to the example in FIG. 3A, the integrated memory assembly 207 in FIG. 3B does not have a stepped offset. A memory die through silicon via (TSV) 276 may be used to route signals through a memory structure die 201. A control die through silicon via (TSV) 278 may be used to route signals through a control die 211.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package.

As has been briefly discussed above, the control die 211 and the memory structure die 201 may be bonded together. Bond pads on each die 201, 211 may be used to bond the two die together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 μm square and spaced from each other with a pitch of 5 μm to 5 μm. While this process is referred to herein as Cu-to-Cu bonding, this term may also apply even where the bond pads are formed of materials other than Cu.

When the area of bond pads is small, it may be difficult to bond the semiconductor die together. The size of, and pitch between, bond pads may be further reduced by providing a film layer on the surfaces of the semiconductor die including the bond pads. The film layer is provided around the bond pads. When the die are brought together, the bond pads may bond to each other, and the film layers on the respective die may bond to each other. Such a bonding technique may be referred to as hybrid bonding. In embodiments using hybrid bonding, the bond pads may be about 5 μm square and spaced from each other with a pitch of 1 μm to 5 μm. Bonding techniques may be used providing bond pads with even smaller sizes and pitches.

Some embodiments may include a film on surface of the dies 201, 211. Where no such film is initially provided, a space between the die may be under filled with an epoxy or other resin or polymer. The under-fill material may be applied as a liquid which then hardens into a solid layer. This under-fill step protects the electrical connections between the dies 201, 211, and further secures the die together. Various materials may be used as under-fill material.

Figure 4:
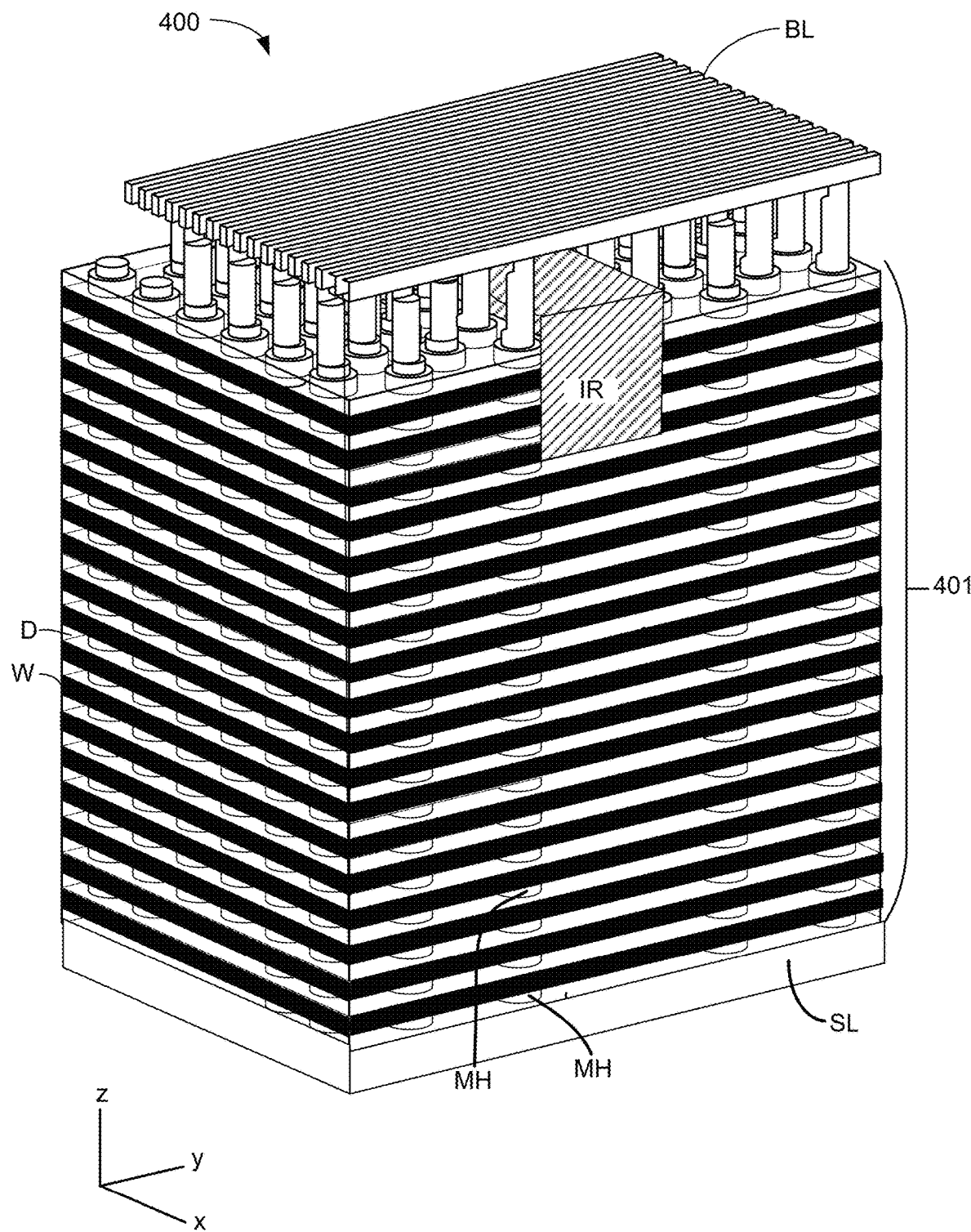
FIG. 4 is a perspective view of a portion of one example embodiment of a monolithic three dimensional memory structure.

FIG. 4 is a perspective view of a portion of one example embodiment of a monolithic three dimensional memory array/structure that can comprise memory structure 202, which includes a plurality non-volatile memory cells arranged as vertical NAND strings. For example, FIG. 4 shows a portion 400 of one block of memory. The structure depicted includes a set of bit lines BL positioned above a stack 401 of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. In one embodiment the alternating dielectric layers and conductive layers are divided into four (or a different number of) regions (e.g., sub-blocks) by isolation regions IR. FIG. 4 shows one isolation region IR separating two sub-blocks. Below the alternating dielectric layers and word line layers is a source line layer SL. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the three dimensional monolithic memory array that comprises memory structure 202 is provided below.

Figure 4A:
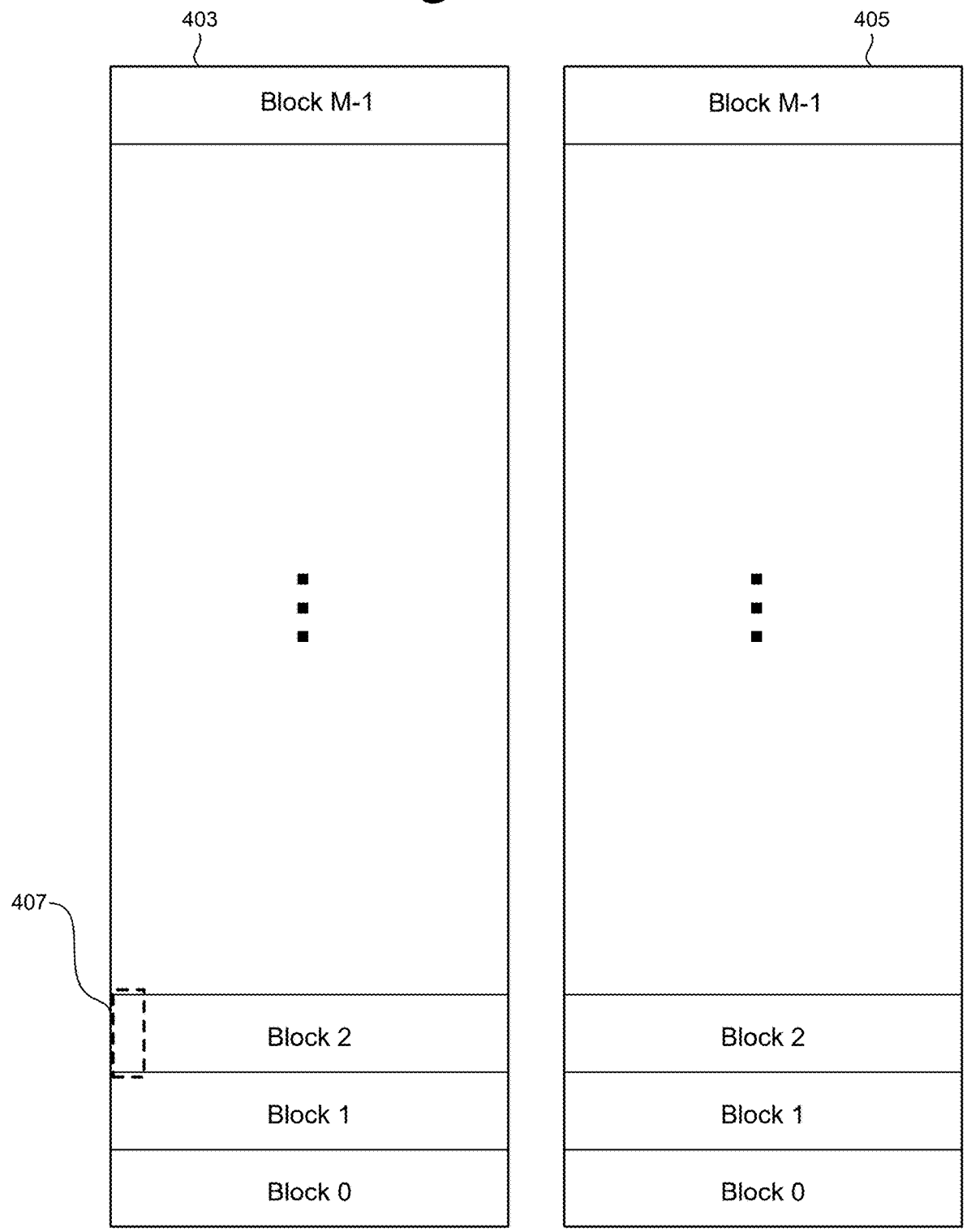
FIG. 4A is a block diagram of one embodiment of a memory structure having two planes.

FIG. 4A is a block diagram explaining one example organization of memory structure 202, which is divided into two planes 403 and 405. Each plane is then divided into M blocks. In one example, each plane has about 2000 blocks. However, different numbers of blocks and planes can also be used. In one embodiment, a block of memory cells is a unit of erase. That is, all memory cells of a block are erased together. In other embodiments, blocks can be divided into sub-blocks and the sub-blocks can be the unit of erase. Memory cells can also be grouped into blocks for other reasons, such as to organize the memory structure to enable the signaling and selection circuits. In some embodiments, a block represents a groups of connected memory cells as the memory cells of a block share a common set of word lines. For example, the word lines for a block are all connected to all of the vertical NAND strings for that block. Although FIG. 4A shows two planes 403/405, more or fewer than two planes can be implemented. In some embodiments, memory structure 202 includes four planes. In some embodiments, memory structure 202 includes eight planes. In some embodiments, programming can be performed in parallel in a first selected block in plane 403 and a second selected block in plane 405.

Figure 4B:
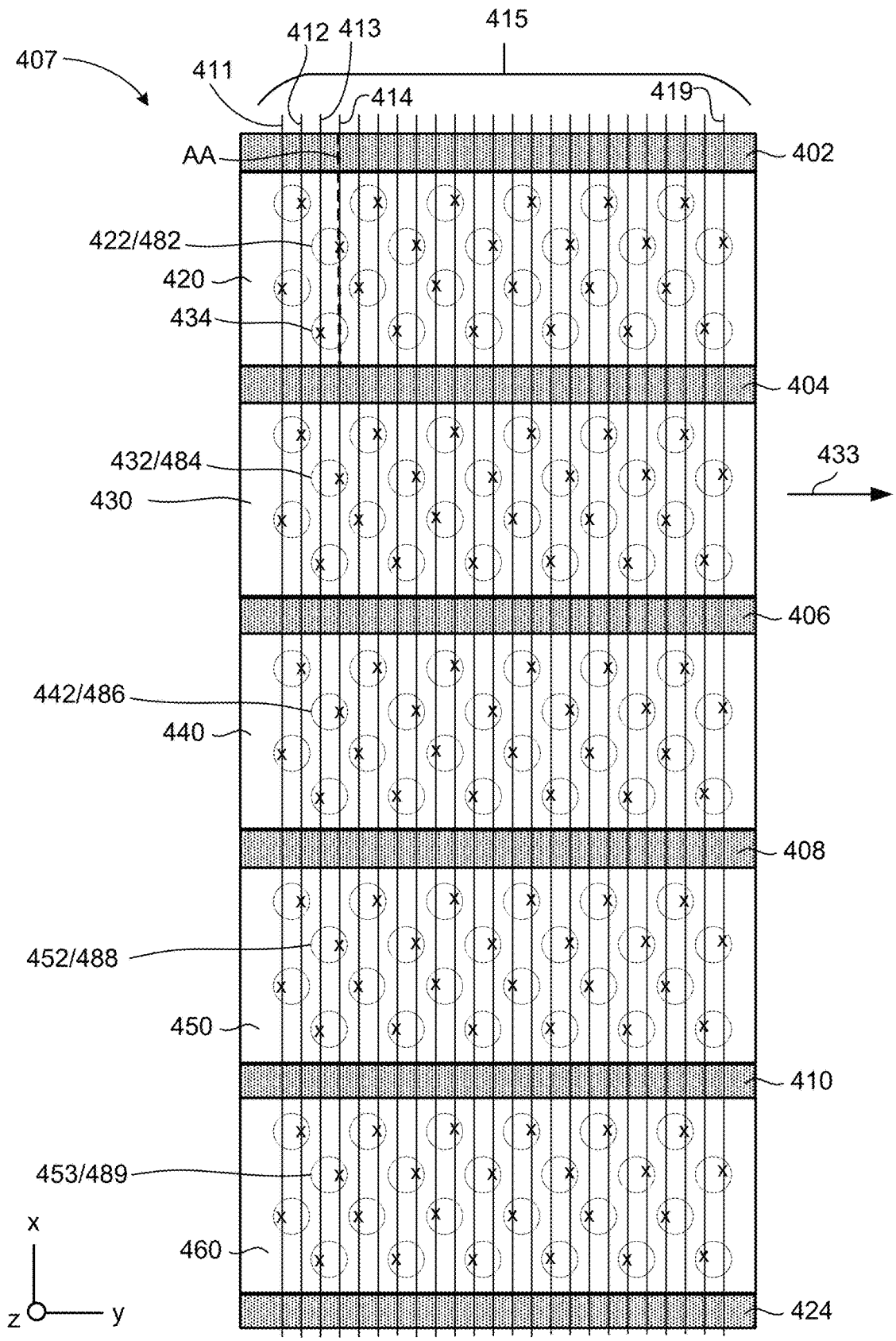
FIG. 4B is a block diagram depicting a top view of a portion of block of memory cells.

FIGS. 4B-4E depict an example three dimensional ("3D") NAND structure that corresponds to the structure of FIG. 4 and can be used to implement memory structure 202 of FIGS. 2A and 2B. FIG. 4B is a block diagram depicting a top view of a portion 407 of Block 2. As can be seen from FIG. 4B, the block depicted in FIG. 4B extends in the direction of arrow 433. In one embodiment, the memory array has many layers; however, FIG. 4B only shows the top layer.

FIG. 4B depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 4B depicts vertical columns 422, 432, 442, 452, and 453. Vertical column 422 implements NAND string 482. Vertical column 432 implements NAND string 484. Vertical column 442 implements NAND string 486. Vertical column 452 implements NAND string 488. Vertical column 453 implements NAND string 489. More details of the vertical columns are provided below. Since the block depicted in FIG. 4B extends in the direction of arrow 433, the block includes more vertical columns than depicted in FIG. 4B.

FIG. 4B also depicts a set of bit lines 415, including bit lines 411, 412, 413, 414, ... 419. FIG. 4B shows twenty-four bit lines because only a portion of the block is depicted. It is contemplated that more than twenty-four bit lines connected to vertical columns of the block. Each of the circles representing vertical columns has an "x" to indicate its connection to one bit line. For example, bit line 414 is connected to vertical columns 422, 432, 442, 452, and 453.

The block depicted in FIG. 4B includes a set of isolation regions 402, 404, 406, 408, 410, and 424, which are formed of SiO$_2$; however, other dielectric materials can also be used. Isolation regions 402, 404, 406, 408, 410, and 424 serve to divide the top layers of the block into five regions; for example, the top layer depicted in FIG. 4B is divided into regions 420, 430, 440, 450, and 460 of which are referred to as sub-blocks. In one embodiment, isolation regions 402 and 424 separate the block from adjacent blocks. Thus, isolation regions 402 and 424 may extend down to the substrate. In one embodiment, the isolation regions 404, 406, 408, and 410 only divide the layers used to implement select gates so that NAND strings in different sub-blocks can be independently selected. Referring back to FIG. 4, the IR region may correspond to any of isolation regions 404, 406, 408 or 410. In one example implementation, a bit line only connects to one vertical column/NAND string in each of regions (sub-blocks) 420, 430, 440, 450 and 460. In that implementation, each block has twenty rows of active columns and each bit line connects to five vertical columns/NAND strings in each block. In one embodiment, all of the five vertical columns/NAND strings connected to a common bit line are connected to the same word line (or set of word lines); therefore, the system uses the drain side selection lines to choose one (or another subset) of the four to be subjected to a memory operation (program, verify, read, and/or erase).

Although FIG. 4B shows each region having four rows of vertical columns, five regions and twenty rows of vertical columns in a block, those exact numbers are an example implementation. Other embodiments may include more or fewer regions per block, more or fewer rows of vertical columns per region and more or fewer rows of vertical columns per block. FIG. 4B also shows the vertical columns being staggered. In other embodiments, different patterns of staggering can be used. In some embodiments, the vertical columns are not staggered.

FIG. 4C depicts a portion of one embodiment of a three dimensional memory structure 202 showing a cross-sectional view along line AA of FIG. 4B. This cross sectional view cuts through vertical columns (NAND strings) 422 and 434 of region 420 (see FIG. 4B). The structure of FIG. 4C includes three drain side select gate layers (SGD0, SGD1 and SGD2). The structure of FIG. 4C also includes three source side select gate layers (SGS0, SGS1 and SGS2). The structure of FIG. 4C also includes five dummy word line layers DD0, DD1, WLIFDU, WLIFDL, DDS; one hundred sixty two word line layers WL0-WL161 for connecting to data memory cells. Dielectric layers are depicted between the conductive layers just described. Other embodiments can be implemented more or fewer than the numbers described above for FIG. 4C. In one embodiment, SGD0, SGD1 and SGD2 are electrically connected together; and SGS0, SGS1 and SGS2 are electrically connected together.

FIG. 4C depicts an embodiment of a stack having two tiers. The two-tier stack comprises an upper tier 421 and a lower tier 423. A two-tier other multi-tier stack can be used to form a relatively tall stack while maintaining a relatively narrow memory hole width (or diameter). After the layers of the lower tier are formed, memory hole portions are formed in the lower tier. Subsequently, after the layers of the upper tier are formed, memory hole portions are formed in the upper tier, aligned with the memory hole portions in the lower tier to form continuous memory holes from the bottom to the top of the stack. The resulting memory hole is narrower than would be the case if the hole was etched from the top to the bottom of the stack rather than in each tier individually. An interface (IF) region is created where the two tiers are connected. The IF region is typically thicker than the other dielectric layers. Due to the presence of the IF region, the adjacent word line layers suffer from edge effects such as difficulty in programming or erasing. These adjacent word line layers can therefore be set as dummy word lines (WLIFDL, WLIFDU). In some embodiments, the upper tier 421 and the lower tier 423 are erased independent of one another. Hence, data may be maintained in the lower tier 423 after the upper tier 421 is erased. Likewise, data may be maintained in the upper tier 421 after the lower tier 423 is erased.

Vertical columns 422 and 434 are depicted protruding through the drain side select layers, source side select layers, IF layer, dummy word line layers and word line layers. In one embodiment, each vertical column comprises a vertical NAND string. Below the vertical columns and the layers listed below is substrate 457, an insulating film 454 on the substrate, and source line SL. The NAND string of vertical column 422 has a source end at the bottom of the stack and a drain end at the top of the stack. As in agreement with FIG. 4B, FIG. 4C show vertical column 422 connected to bit line 414 via connector 417.

One of the isolation regions 402 is depicted adjacent to the stack, in agreement with FIG. 4B. The isolation region 402 has a conductive region 499 surrounded by an insulating material 497. The conductive region 499 extends down to the source line (SL) and provides operating voltages to the SL. The conductive region 499 may be formed from, for example, tungsten. The insulating material 497 may be formed from, for example, silicon oxide. It is possible for a short circuit to occur between a word line and the conductive region 499. An example defect 495 that results in a short circuit between WL159 and the conductive region 499 is depicted. The conductive region 499 may be referred to herein as a local interconnect (LI). In one embodiment, such word line to LI short circuits are detected. Defects such as defect 495 may be present when the memory structure is manufactured or may develop as a result of normal memory operations.

Another type of short circuit that may be detected is a word line to memory hole short circuit. Defect 493 may result in a short circuit between WL158 and the memory hole 422. In one embodiment, such word line to memory hole short circuits are detected. Defects such as defect 493 may be present when the memory structure is manufactured or may develop as a result of normal memory operations.

For ease of reference, drain side select layers, source side select layers, dummy word line layers, and data word line layers collectively are referred to as the conductive layers. In one embodiment, the conductive layers are made from a combination of TiN and Tungsten. In other embodiments, other materials can be used to form the conductive layers, such as doped polysilicon, metal such as Tungsten or metal silicide. In some embodiments, different conductive layers can be formed from different materials. Between conductive layers are dielectric layers. In one embodiment, the dielectric layers are made from SiO$_2$. In other embodiments, other dielectric materials can be used to form the dielectric layers.

The non-volatile memory cells are formed along vertical columns which extend through alternating conductive and dielectric layers in the stack. In one embodiment, the memory cells are arranged in NAND strings. The word line layers WL0-W161 connect to memory cells (also called data memory cells). Dummy word line layers DD0, DD1 and DDS connect to dummy memory cells. A dummy memory cell does not store and is not eligible to store host data (data provided from the host, such as data from a user of the host), while a data memory cell is eligible to store host data. In some embodiments, data memory cells and dummy memory cells may have a same structure. Drain side select layers SGD0, SGD1, and SGD2 are used to electrically connect and disconnect (or cut off) the channels of respective NAND strings from bit lines. Source side select layers SGS0, SGS1, and SGS2 are used to electrically connect and disconnect (or cut off) the channels of respective NAND strings from the source line SL.

Figure 4D:
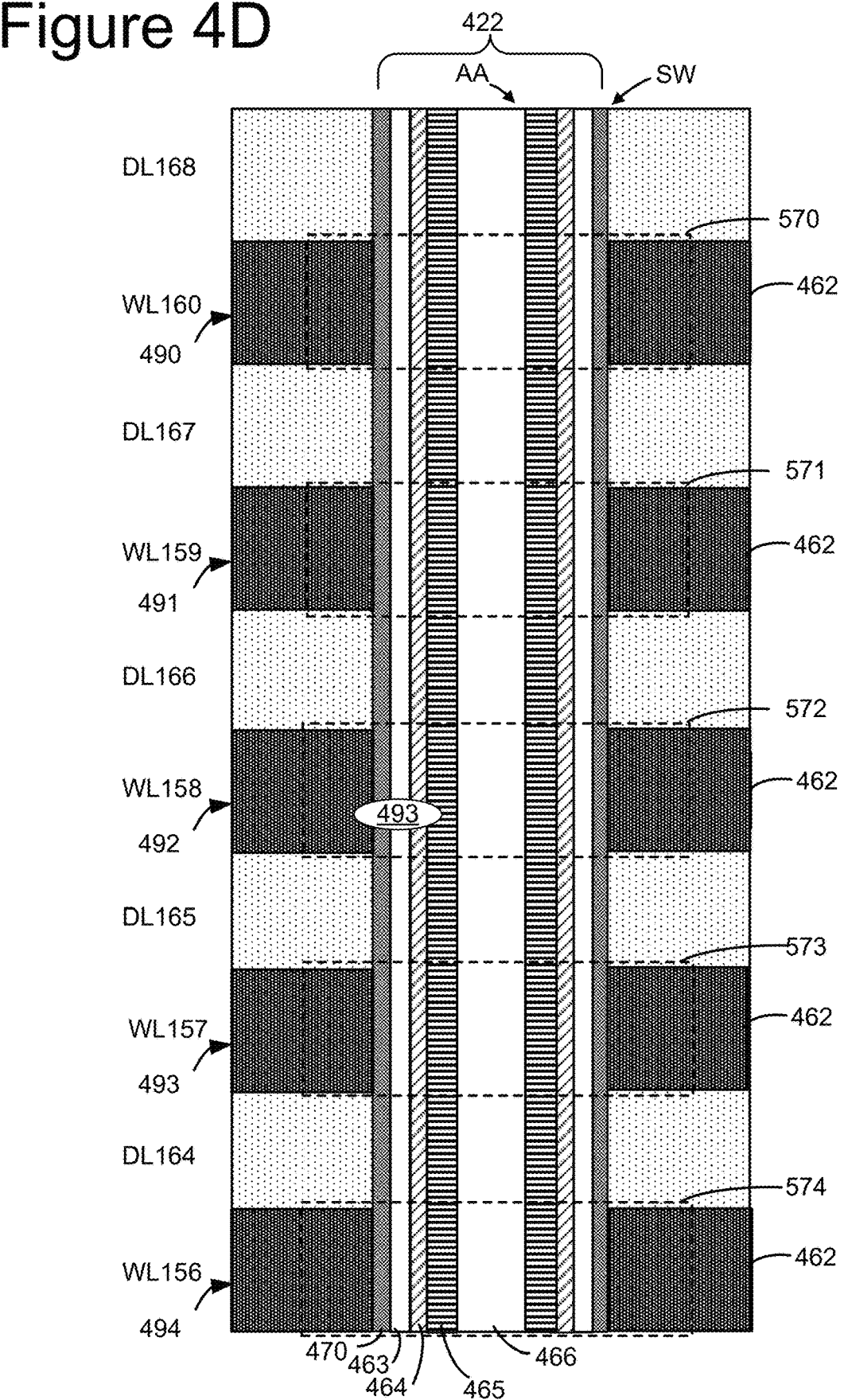
FIG. 4D depicts a view of the region 445 of FIG. 4C.

FIG. 4D depicts a view of the region 445 of FIG. 4C. Included are WL156-160 and dielectric layers DL164-DL168. Data memory cell transistors 570, 571, 572, 573, and 574 are indicated by the dashed lines. A number of layers can be deposited along the sidewall (SW) of the memory hole 422 and/or within each word line layer, e.g., using atomic layer deposition. For example, each column (e.g., the pillar which is formed by the materials within a memory hole) can include a blocking oxide/block high-k material 470, charge-trapping layer or film 463 such as SiN or other nitride, a tunneling layer 464, a polysilicon body or channel 465, and a dielectric core 466. A word line layer can include a conductive metal 462 such as Tungsten as a control gate. For example, control gates 490, 491, 492, 493 and 494 are provided. In this example, all of the layers except the metal are provided in the memory hole. In other approaches, some of the layers can be in the control gate layer. Additional pillars are similarly formed in the different memory holes. A pillar can form a columnar active area (AA) of a NAND string.

As mentioned above, one type of short circuit that may be detected is a word line to memory hole short circuit. Defect 493 may result in a short circuit between WL158 and one or more of the layers in the memory hole 422 such as, for example, charge-trapping layer 463 and/or polysilicon body 465. In one embodiment, such word line to memory hole short circuits are detected.

When a data memory cell transistor is programmed, electrons are stored in a portion of the charge-trapping layer which is associated with the data memory cell transistor. These electrons are drawn into the charge-trapping layer from the channel, and through the tunneling layer. The Vth of a data memory cell transistor is increased in proportion to the amount of stored charge. During an erase operation, the electrons return to the channel.

Each of the memory holes can be filled with a plurality of annular layers (also referred to as memory film layers) comprising a blocking oxide layer, a charge trapping layer, a tunneling layer and a channel layer. A core region of each of the memory holes is filled with a body material, and the plurality of annular layers are between the core region and the WLLs in each of the memory holes. In some cases, the tunneling layer 464 can comprise multiple layers such as in an oxide-nitride-oxide configuration.

Figure 4E:
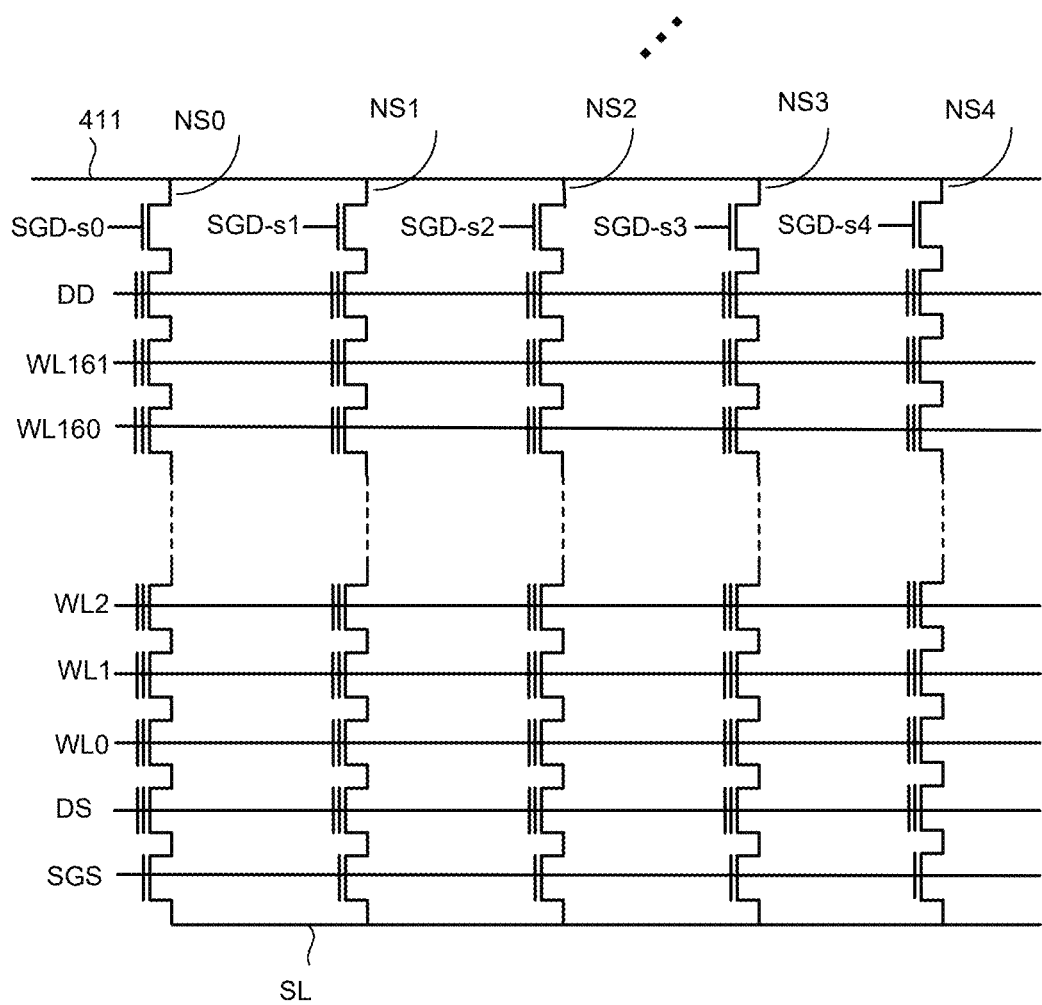
FIG. 4E is a schematic diagram of a portion of one embodiment of a block, depicting several NAND strings.

FIG. 4E is a schematic diagram of a portion of the memory depicted in FIGS. 4-4D. FIG. 4E shows physical word lines WL0-WL161 running across the entire block. The structure of FIG. 4E corresponds to portion 407 in Block 2 of FIGS. 4A-4B, including bit lines 411, 412, 413, 414, . . . 419. Within the block, each bit line is connected to five NAND strings. Drain side selection lines SGD-s0, SGD-s1, SGD-s2, SGD-s3 and SGD-s4 are used to determine which of the five NAND strings (NS0, NS1, NS2, NS3, NS4) connect to the associated bit line. Other NAND strings of the block and other bit lines are not depicted in FIG. 4E. A first sub-block corresponds to those vertical NAND strings controlled by SGD-s0. A second sub-block corresponds to those vertical NAND strings controlled by SGD-s1. A third sub-block corresponds to those vertical NAND strings controlled by SGD-s2. A fourth sub-block corresponds to those vertical NAND strings controlled by SGD-s3. A fifth sub-block corresponds to those vertical NAND strings controlled by SGD-s4. There may be more or fewer than five sub-blocks in a block.

A source side selection line SGS connects/disconnects the NAND strings to/from the common source line. In some embodiments, there is a source side selection line for each sub-block (similar to the five SGD-s0, SGD-s1, SGD-s2, SGD-s3 and SGD-s4). The block can also be thought of as divided into five sub-blocks SB0, SB1, SB2, SB3, SB4. Sub-block SB0 corresponds to those vertical NAND strings controlled by SGD-s0, Sub-block SB1 corresponds to those vertical NAND strings controlled by SGD-s1, Sub-block SB2 corresponds to those vertical NAND strings controlled by SGD-s2, Sub-block SB3 corresponds to those vertical NAND strings controlled by SGD-s3, and Sub-block SB4 corresponds to those vertical NAND strings controlled by SGD-s4.

Although the example memories of FIGS. 4-4E are three dimensional memory structure that includes vertical NAND strings with charge-trapping material, other (2D and 3D) memory structures can also be used with the technology described herein.

The memory systems discussed above can be erased, programmed and read. Each memory cell may be associated with a memory state according to write data in a program command. Based on its memory state, a memory cell will either remain in the erased state or be programmed to a memory state (a programmed memory state) different from the erased state.

For example, in a two-bit per cell memory device (sometimes referred to as a multi-level cell (MLC)), there are four memory states including the erased state and three programmed memory states referred to as the A, B and C memory states. In a three-bit per cell memory device (sometimes referred to as a tri-level cell (TLC)), there are eight memory states including the erased state and seven programmed memory states referred to as the A, B, C, D, E, F and G memory states. In a four-bit per cell memory device (sometimes referred to as a quad-level cell (QLC)), there are sixteen memory states including the erased state and fifteen programmed memory states referred to as the Er, S1, S2, S3, S4, S5, S6, S7, S8, S9, S10, S11, S12, S13, S14 and S15 memory states.

Figure 5A:
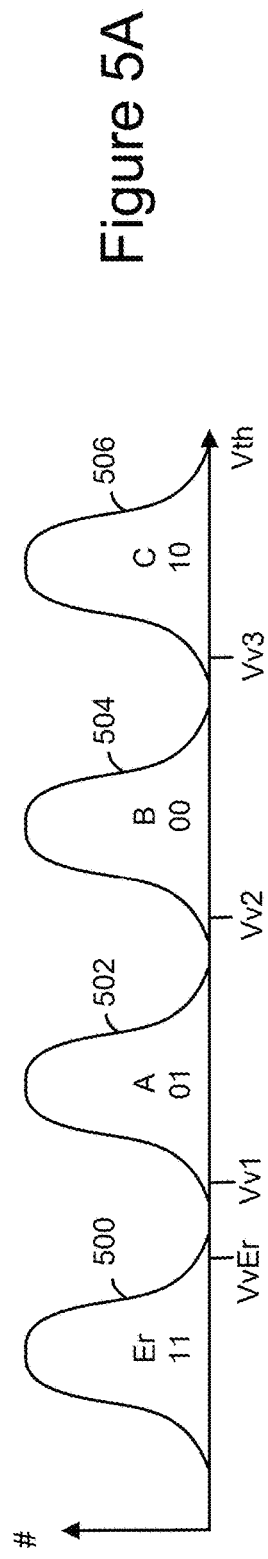
FIGS. 5A, 5B and 5C depict threshold voltage distributions.

FIG. 5A depicts an embodiment of threshold voltage Vth distributions for a four-state memory device in which each memory cell stores two bits of data. A first threshold voltage Vth distribution 500 is provided for erased (Er-state) storage elements. Three threshold voltage Vth distributions 502, 504 and 506 represent programmed memory states A, B and C, respectively. A 2-bit code having lower and upper bits can be used to represent each of the four memory states. In an embodiment, the "Er," "A," "B," and "C" memory states are respectively represented by "11," "01," "00," and "10."

Figure 5B:
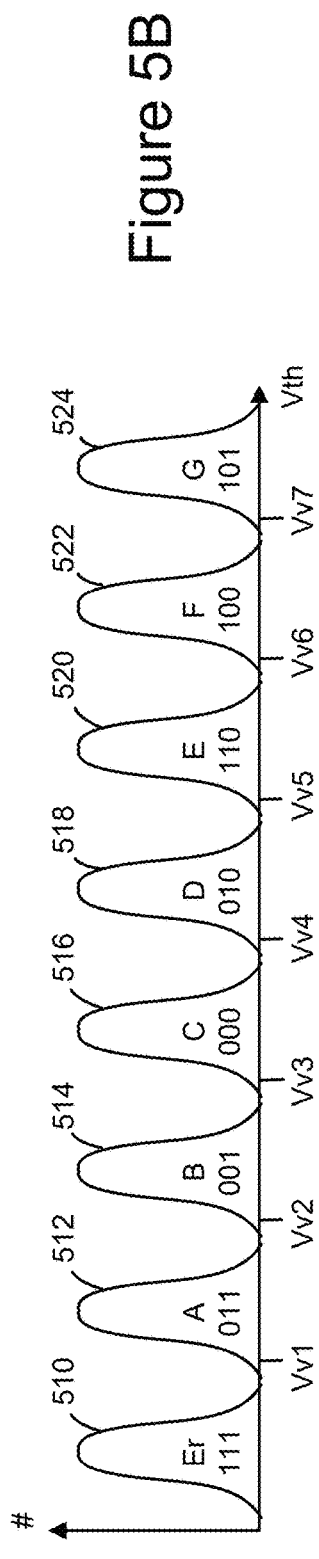

FIG. 5B depicts an embodiment of threshold voltage Vth distributions for an eight-state memory device in which each memory cell stores three bits of data. A first threshold voltage Vth distribution 510 is provided for Er-state storage elements. Seven threshold voltage Vth distributions 512, 514, 516, 518, 520, 522 and 524 represent programmed memory states A, B, C, D, E, F and G, respectively. A 3-bit code having lower page, middle page and upper page bits can be used to represent each of the eight memory states. In an embodiment, the "Er," "A," "B," "C," "D," "E," "F" and "G" memory states are respectively represented by "111," "011," "001," "000," "010," "110," "100" and "101."

Figure 5C:
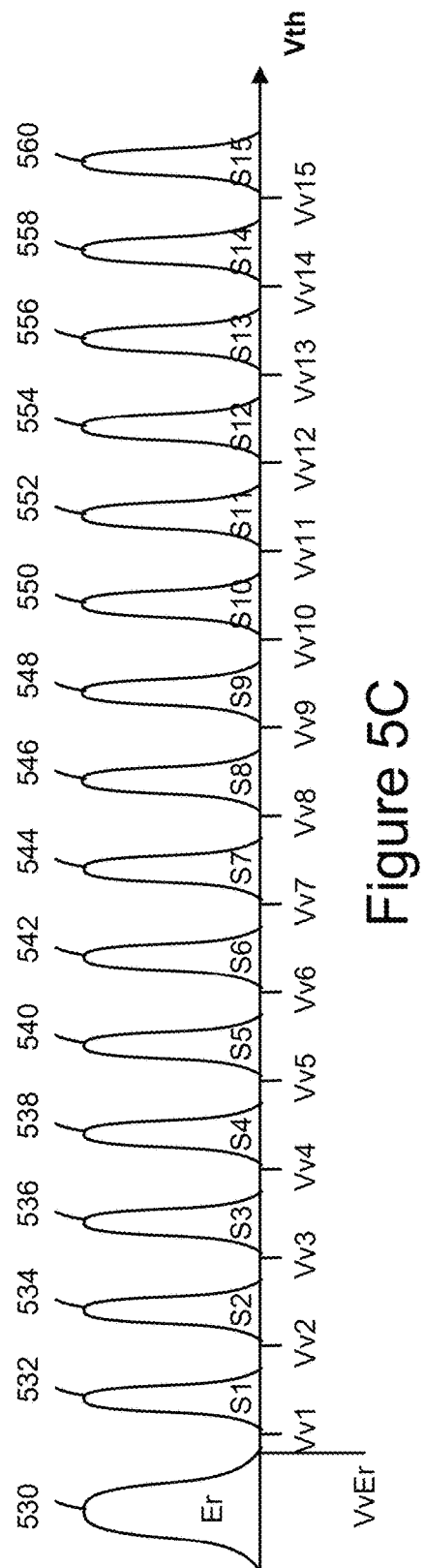

FIG. 5C depicts an embodiment of threshold voltage Vth distributions for a sixteen-state memory device in which each memory cell stores four bits of data. A first threshold voltage Vth distribution 530 is provided for erased Er-state storage elements. Fifteen threshold voltage Vth distributions 532, 534, 536, 538, 540, 542, 544, 546, 548, 550, 552, 554, 556, 558 and 560 represent programmed memory states S1, S2, S3, S4, S5, S6, S7, S8, S9, S10, S11, S12, S13, S14 and S15, respectively.

A 4-bit code having lower page, middle page, upper page and top page bits can be used to represent each of the sixteen memory states. In an embodiment, the S0, S1, S2, S3, S4, S5, S6, S7, S8, S9, S10, S11, S12, S13, S14 and S15 memory states are respectively represented by "1111," "1110," "1100," "1101," "1001," "0001," "0101," "0100," "0110," "0010," "0000," "1000," "1010," "1011," "0011," and "0111," respectively.

The technology described herein also can be used with other types of programming in addition to full sequence programming (including, but not limited to, multiple stage/phase programming). In some embodiments, programmed states (e.g., S1-S15) can overlap, with controller 120 (FIG. 1) relying on error correction to identify the correct data being stored.

Figure 6:
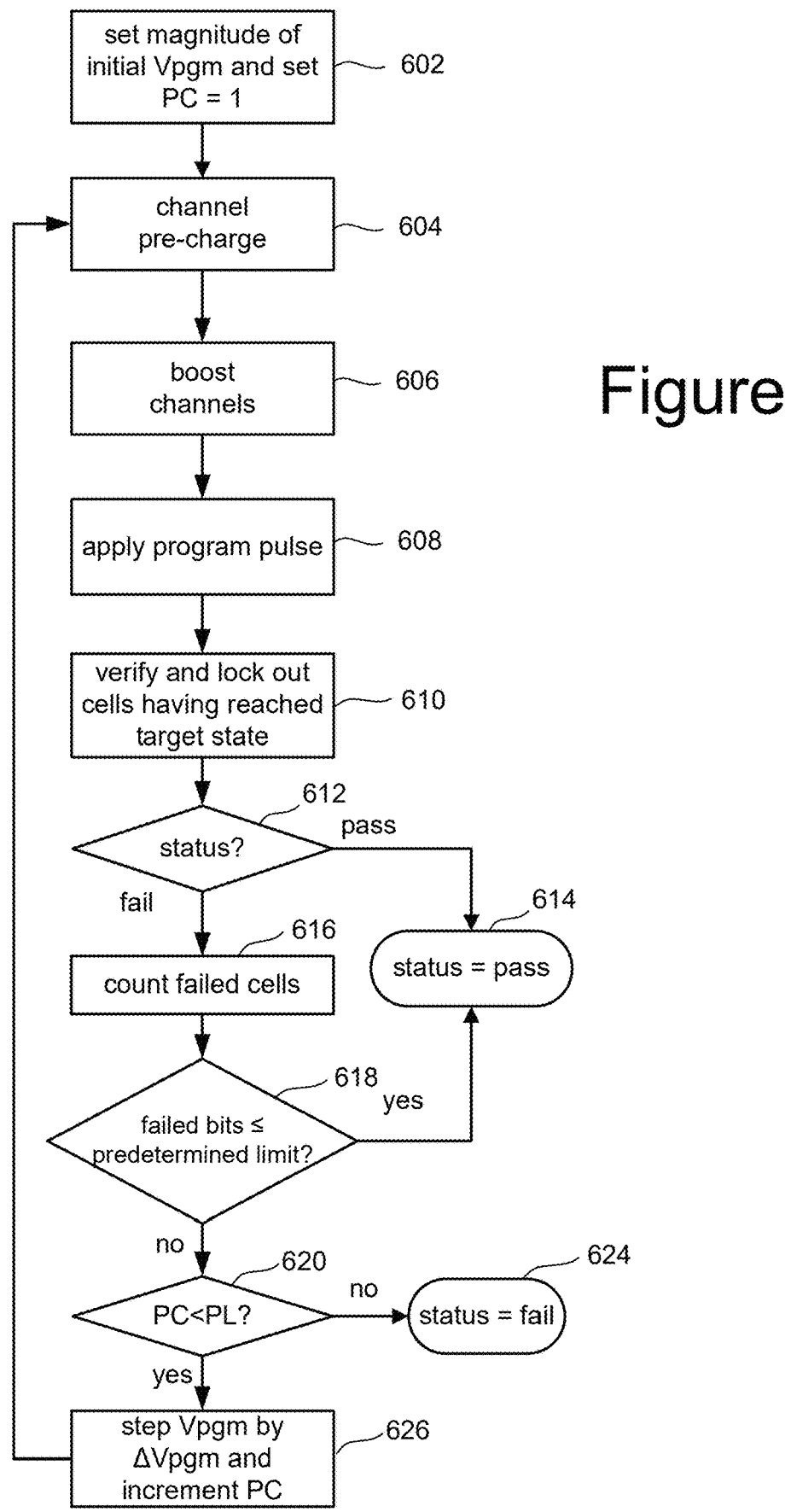
FIG. 6 is a flowchart describing one embodiment of a process for programming memory cells.

FIG. 6 is a flowchart describing one embodiment of a process for programming memory cells. For purposes of this document, the term program and programming are synonymous with write and writing. In one example embodiment, the process of FIG. 6 is performed for memory structure 202 using the one or more control circuits (e.g., system control logic 260, column control circuitry 210, row control circuitry 220) discussed above. In one example embodiment, the process of FIG. 6 is performed by integrated memory assembly 207 using the one or more control circuits (e.g., system control logic 260, column control circuitry 210, row control circuitry 220) of control die 211 to program memory cells on memory structure die 201. The process includes multiple loops, each of which includes a program phase and a verify phase. The process of FIG. 6 is performed to implement the full sequence programming, as well as other programming schemes including multi-stage programming. When implementing multi-stage programming, the process of FIG. 6 is used to implement any/each stage of the multi-stage programming process.

Typically, the program voltage applied to the control gates (via a selected data word line) during a program operation is applied as a series of program pulses (e.g., voltage pulses). Between programming pulses a set of verify pulses (e.g., voltage pulses) may be used to perform verification. In many implementations, the magnitude of the program pulses is increased with each successive pulse by a predetermined step size. In step 602 of FIG. 6, the programming voltage signal (Vpgm) is initialized to the starting magnitude (e.g., ~12-16V or another suitable level) and a program counter PC maintained by state machine 262 is initialized at 1. In one embodiment, the group of memory cells selected to be programmed (referred to herein as the selected memory cells) are programmed concurrently and are all connected to the same word line (the selected word line). There will likely be other memory cells that are not selected for programming (unselected memory cells) that are also connected to the selected word line. That is, the selected word line will also be connected to memory cells that are supposed to be inhibited from programming. Additionally, as memory cells reach their intended target data state, they will be inhibited from further programming. Those NAND strings (e.g., unselected NAND strings) that include memory cells connected to the selected word line that are to be inhibited from programming have their channels boosted to inhibit programming. When a channel has a boosted voltage, the voltage differential between the channel and the word line is not large enough to cause programming. To assist in the boosting, in step 604 the control die will pre-charge channels of NAND strings that include memory cells connected to the selected word line that are to be inhibited from programming. In step 606, NAND strings that include memory cells connected to the selected word line that are to be inhibited from programming have their channels boosted to inhibit programming. Such NAND strings are referred to herein as "unselected NAND strings." In one embodiment, the unselected word lines receive one or more boosting voltages (e.g., ~7-11 volts) to perform boosting schemes. A program inhibit voltage and is applied to the bit lines coupled with the unselected NAND string.

In step 608, a program voltage pulse of the programming voltage signal Vpgm is applied to the selected word line (the word line selected for programming). If a memory cell on a NAND string should be programmed, then the corresponding bit line is biased at a program enable voltage. In step 608, the program pulse is concurrently applied to all memory cells connected to the selected word line so that all of the memory cells connected to the selected word line are programmed concurrently (unless they are inhibited from programming). That is, they are programmed at the same time or during overlapping times (both of which are considered concurrent). In this manner all of the memory cells connected to the selected word line will concurrently have their threshold voltage change, unless they are inhibited from programming.

In step 610, program verify is performed and memory cells that have reached their target states are locked out from further programming by the control die. Step 610 includes performing verification of programming by sensing at one or more verify reference levels. In one embodiment, the verification process is performed by testing whether the threshold voltages of the memory cells selected for programming have reached the appropriate verify reference voltage. In step 610, a memory cell may be locked out after the memory cell has been verified (by a test of the Vt) that the memory cell has reached its target state. For example, a memory cell may be locked out if it reaches a verify reference voltage.

If, in step 612, it is determined that all of the memory cells have reached their target threshold voltages (pass), the programming process is complete and successful because all selected memory cells were programmed and verified to their target states. A status of "PASS" is reported in step 614. Otherwise if, in step 612, it is determined that not all of the memory cells have reached their target threshold voltages (fail), then the programming process continues to step 616.

In step 616, the number of memory cells that have not yet reached their respective target threshold voltage distribution are counted. That is, the number of memory cells that have, so far, failed to reach their target state are counted. This counting can be done by state machine 262, memory controller 120, or another circuit. In one embodiment, there is one total count, which reflects the total number of memory cells currently being programmed that have failed the last verify step. In another embodiment, separate counts are kept for each data state.

In step 618, it is determined whether the count from step 616 is less than or equal to a predetermined limit. In one embodiment, the predetermined limit is the number of bits that can be corrected by error correction codes (ECC) during a read process for the page of memory cells. If the number of failed cells is less than or equal to the predetermined limit, than the programming process can stop and a status of "PASS" is reported in step 614. In this situation, enough memory cells programmed correctly such that the few remaining memory cells that have not been completely programmed can be corrected using ECC during the read process. In some embodiments, the predetermined limit used in step 618 is below the number of bits that can be corrected by error correction codes (ECC) during a read process to allow for future/additional errors. When programming fewer than all of the memory cells for a page, or comparing a count for only one data state (or less than all states), than the predetermined limit can be a portion (pro-rata or not pro-rata) of the number of bits that can be corrected by ECC during a read process for the page of memory cells. In some embodiments, the limit is not predetermined. Instead, it changes based on the number of errors already counted for the page, the number of program-erase cycles performed or other criteria.

If the number of failed memory cells is not less than the predetermined limit, than the programming process continues at step 620 and the program counter PC is checked against the program limit value (PL). Examples of program limit values include 6, 12, 16, 19, 20 and 30; however, other values can be used. If the program counter PC is not less than the program limit value PL, then the program process is considered to have failed and a status of FAIL is reported in step 624. If the program counter PC is less than the program limit value PL, then the process continues at step 626 during which time the Program Counter PC is incremented by 1 and the programming voltage signal Vpgm is stepped up to the next magnitude. For example, the next pulse will have a magnitude greater than the previous pulse by a step size ΔVpgm (e.g., a step size of 0.1-1.0 volts). After step 626, the process loops back to step 604 and another program pulse is applied to the selected word line so that another iteration (steps 604-626) of the programming process of FIG. 6 is performed.

In one embodiment memory cells are erased prior to programming, and erasing is the process of changing the threshold voltage of one or more memory cells from a programmed data state to an erased data state. For example, changing the threshold voltage of one or more memory cells from states A-C to state Er of FIG. 5A, from states A-G to state Er of FIG. 5B, or from states S1-S15 to state Er of FIG. 5C.

3D NAND flash memory is widely used for storage and data transfer in consumer devices, enterprise systems and industrial applications because of its nonvolatility, affordability, high storage density and access speeds. 3D NAND memory's capacity has enlarged significantly as the vertical layers (number of word lines) of the array have increased in number and become thinner. Because of this, word line related defects present a major challenge in device development. The common method to counter word line related defects is a combination of stress and screen. Engineers use stress to make the defective points weaker and choose a proper screen to detect the defects and before the devices are passed on to the consumer. The selection of stress conditions is very important for the product screening since, if the defective parts of the memory array do not get enough stress, it may later become defective (often measured in defective parts per million, or DPPM) and make quality suffer. However, stressing the array can also be harmful since, if good parts were over stressed, they may be damaged and screened out, reducing yields and causing profits to suffer. Engineers will often invest a lot of resources on finding suitable stress conditions, as this can be a complex trade-off between quality control and yield. Since NAND memory has a complex hierarchy of die, plane, block, word line and so on, the variations within these different levels of hierarchy are complicated. The die-to-die variations and block-to-block variations make it even harder for engineers to decide on stress conditions. The following considers stress methods with die/block variations taken into consideration for better yield and DPPM of NAND memory die. Although the discussion is presented in the context of 3D NAND memory as described above, it can more generally applied to other memory technologies, such as MRAM or PCM, that can suffer from leakages from word lines or other control lines of the memory array.

Figures 7A, 7B:
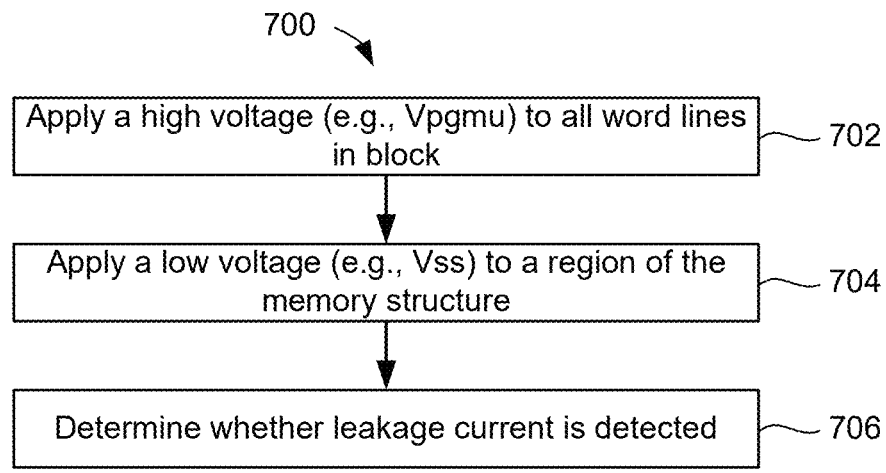
FIG. 7A is a flowchart of one embodiment of a process of determining whether a block of word lines contains a leaky word line.
FIG. 7B is a table that provides further details of voltages applied during an embodiment of the process of FIG. 7A.

To determine word line leakage, one or more of the word lines of a memory block or blocks are charged to a high stress voltage, such as a program voltage Vpgm, while other elements of the array are biased at a low voltage, such as Vss or 0V. The charged up word lines are then checked to see whether there is leakage current. Which word lines are biased at the stress voltage and what array elements are biased low depends on the test mode, where several test modes may be performed. The testing can be part of the test process performed on memory die before they are shipped out for customer use or, in other cases, such tests can also be formed once the memory die is in use. For example, leaky word lines may be detected during a built-in self-test (BIST). The specific type of test modes performed will depend on the specifics of the memory die, but for some examples in the 3D NAND memory example are tests for word line to memory hole leakage, word line to word line leakage, and word line to local interconnect leakage. Additionally, the test can be performed at different level of granularity, such as at the die level, block level, sub-block level, or word line level. FIGS. 7A and 7B consider an example of a block level leakage test.

FIG. 7A is a flowchart of one embodiment of a process 700 for determining whether a block of word lines contains a leaky word line. Step 702 includes applying a high voltage (e.g., Vpgmu) to all word lines in the block. Note that the program voltage used during program operations may vary depending on the program loop. The voltage Vpgmu may be the highest of these program voltages, or even higher than the highest program voltage typically used during a program operation. As one example, Vpgmu could be 25V. However, Vpgmu could be higher or lower than 25V. In one embodiment, the system control logic 200, including the state machine 262, instructs the control gate decoder of row control circuitry 220 to apply the high voltage to all word lines in the block. Step 704 includes applying a low voltage to a region of the memory structure. In one embodiment, the low voltage is applied to a source line in order to test for a word line to source line short. In one embodiment, the low voltage is applied to a bit line in order to test for a word line to memory hole short. In one embodiment, the low voltage is applied to both the bit line and the source line to test for either a word line to memory hole short or a word line to source line short. Step 706 includes determining whether a leakage current is detected. In one embodiment, leakage current a detection circuit such as described below with respect to FIGS. 13-16 monitoring for a leakage current. In one embodiment, a leakage current may flow if there is a short circuit between any of the word lines in the block and the source line. In one embodiment, a leakage current may flow if there is a short circuit between any of the word lines in the block and the memory hole (e.g., the NAND string channel). Embodiments for leakage detection are discussed in more detail below.

FIG. 7B is a table that provides further details of voltages applied during an embodiment of the process 700. A high voltage (e.g., Vpgmu) is applied to all of the data word lines in this example, but a lower voltage (e.g., Vpass) may be applied to all of the dummy word lines. The data word lines in FIG. 7B are WL0 to WL80 in the lower tier and WL81 to WL161 in the upper tier. The dummy word lines in FIG. 7B include one or more source side dummy WLs (DS), a dummy word line adjacent to the IF at the top of the lower tier (WLIFDL), a dummy word line adjacent to the IF at the bottom of the upper tier (WLIFDU), and one or more drain side dummy WLs (DD). A low voltage (e.g., Vss or 0V) is applied to both the bit lines (BL) and the source line (SL). The bit lines and the source line are examples of conductive lines connected to ends of the NAND strings. The voltage Vsgd applied to the one or more SGD line may be a select voltage that turns on the drain side select gates. The voltage Vsgs applied to the one or more SGS line may be a select voltage that turns on the source side select gates. In one embodiment, the voltages that are applied as depicted in FIG. 7B will result in a high voltage on the word lines and a low voltage on the NAND channel of the memory hole to test for a word line to memory hole short circuit. In one embodiment, the voltages that are applied as depicted in FIG. 7B will result in a high voltage on the word lines and a low voltage on the source line to test for a word line to LI short circuit. In a test embodiment where only one or a sub-set of the word lines are biased with the stress voltage for testing, the non-stress selected word lines can be biased at Vpass.

As noted, testing for word line leakage can be performed as part of die sort testing before devices are shipped, be performed by the control circuitry of memory die 200 or control die 211, or both. FIG. 8 looks at an embodiment of incorporating a built-in self-test for detecting grown defects (i.e., defects that develop after the device is in use) into memory operation.

FIG. 8 is a flowchart of one embodiment of a process 800 of detecting grown bad blocks in a non-volatile storage system. The process 800 may be performed by one or more control circuits in the storage system 100. Process 800 describes detecting grown bad blocks in the context of garbage collection. Garbage collection may include data compaction in which valid data from one or more source blocks is copied to one or more destination blocks. A source block may be identified for data compaction when the amount of valid data falls below a threshold percentage. Note that detecting grown bad blocks can be performed without garbage collection. In an alternative embodiment, detecting grown bad blocks is performed in response to a special command sequence. For example, the memory controller 120 could issue a command sequence to the die (memory die 200, control die 211) to detect grown bad blocks.

Step 802 includes identifying an available free block to transfer valid data. In an embodiment, the memory controller 120 identifies one or more free blocks in the storage 130. Step 804 includes copying valid data from a selected block to the free block. This copying may include data compaction. Step 806 includes erasing the selected block after the valid data has been successfully transferred. At this time a stress test may be performed on the selected block. However, the stress test is not necessarily performed each time that the selected block is erased. In one embodiment, the stress test is performed once each n program/erase cycles. The value of n could be, for example, 10, 20, or some other value. If the stress test is not to be performed (step 808 is no), then the selected block is allocated to a free block pool in step 812. Alternatively, the stress test may be performed in step 810, where this can be as described with respect to FIGS. 7A and 7B. The stress test may accelerate stressful conditions on the memory cells and thereby provide for early detection of grown bad blocks. Moreover, the number of grown bad blocks that escape detection is kept low. Step 814 includes a determination of whether the block passes the stress test. If the block passes the stress test, then the block is allocated to the free block pool in step 812. If the block fails the stress test, then the block is retired in step 816. The block may be retired by adding the block to a list of grown bad blocks. In an embodiment, the memory controller 120 maintains the list of free blocks and grown bad blocks.

Although the techniques presented in the following can be applied to testing for word line leakage once a memory die is in use with a customer, the discussion will primary be presented in the context of pre-shipping testing, such as performed at die sort testing when defective devices can be weeded out. Traditionally, there are two main ways of applying word line stress for such tests, as illustrated by FIGS. 9 and 10.

Figure 9:
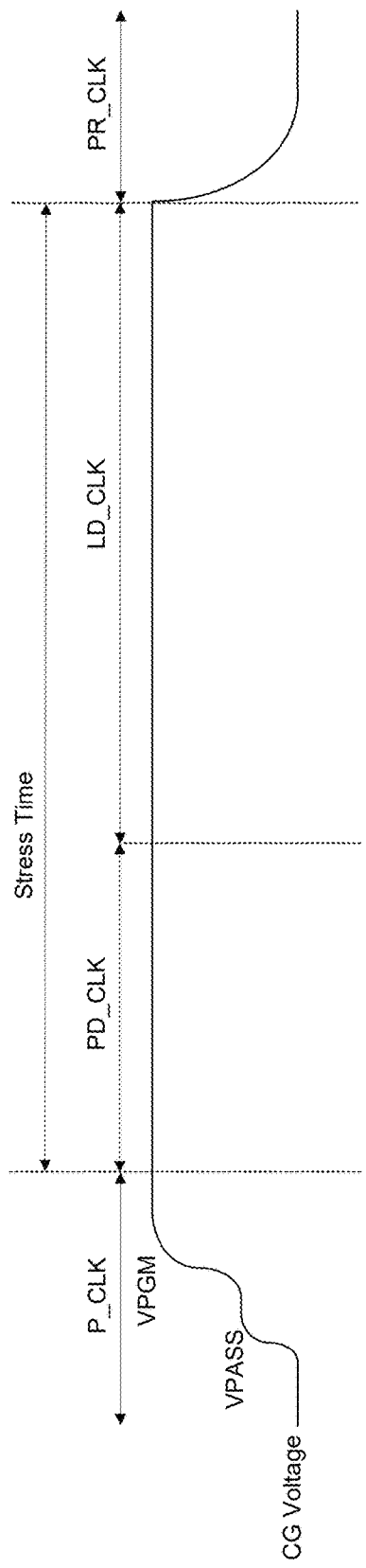
FIGS. 9 and 10 respectively present embodiments for stress-selected word line stress voltage levels using a clock count based word line leakage detection method and a manual program based word line leakage detection method.
Figure 10:
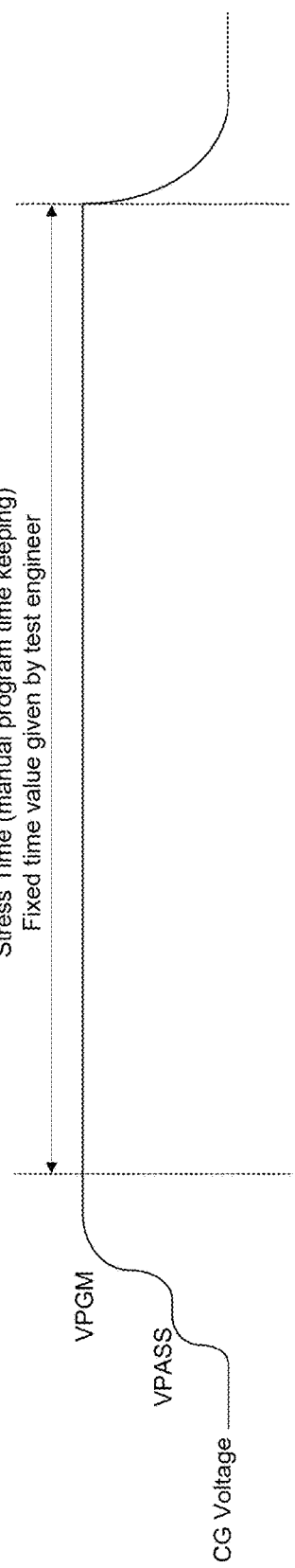

FIGS. 9 and 10 respectively present embodiments for stress-selected word line stress voltage levels using a clock count based word line leakage detection method and a manual program based word line leakage detection method. In both cases, the stress selected word line can be all of the word lines of a block or blocks, a single word line, or a sub-set of a block's word lines. For example, in a word line to memory hole or word line to local interconnect (LI) test mode, all of the word lines (or non-dummy word lines) may be selected, while in a word line to word line leakage test mode even word lines may be set to the high stress voltage level and odd word lines set to a low voltage (or vice versa). In both cases, the shown embodiments ramp up the control gate voltages on the word lines to the intermediate Vpass voltage at the same time that the dummy word lines, non-stress selected data word lines, and control gate lines are ramped up, before then further ramping up to a program voltage level. This higher word line voltage can be the Vpgmu as discussed above or other stress level.

Considering the manual program method of FIG. 10, at test time a manual program command can apply the stress voltage for a fixed stress time on all selected word lines, where this can be at the die, block, sub-block, or word line level. The stress time can be specified by a test engineer. Although this allows the stress to be specified, the stress time and amplitude values will typically be the same across all dies and blocks, such as established as part of device characterization, but would be impractical to vary from die to die or block to block as test time, given the extremely large number of dies and blocks per die.

In a clock count method for wore line leak detection as illustrated in FIG. 9, a fixed stress time is applied to all selected die/block/word lines based a leak detection clock value LD_CLK, that can be added in the other programming sub-clocks. In this example, an initial programing clock P_CLK is for the ramp up period, a clock PD_CLK for program pulse duration, then the additional stress time LD_CLK, followed by the verify (or program read) clock PR_CLK when the waveform ramps down. The total stress time is the combined clocks PD_CLK and LD_CLK. The duration of these clocks can be configured by setting the related parameters that can be determined as part of device characterization and stored in storage 266 of system control logic 260.

The word line stress methods illustrated with respect to FIGS. 9 and 10 will apply the same stress time on every die/block; however, determining the stress levels can be delicate. Applying weaker stress values can result in higher yields, but at the cost of more defective parts, such as measure in DPPM. Higher stress values will decrease DPPM values, but at the cost of a yield penalty. Additionally, if the stress levels are too high, this can degrade devices that would otherwise be fine, resulting in worse values for both yield and DPPM. Determining suitable stress conditions under the method illustrated with respect to FIGS. 9 and 10 is consequently a tradeoff between yield and DPPM, with a high yield loss penalty having to be paid in order to achieve a low DPPM specification.

Figure 11A:
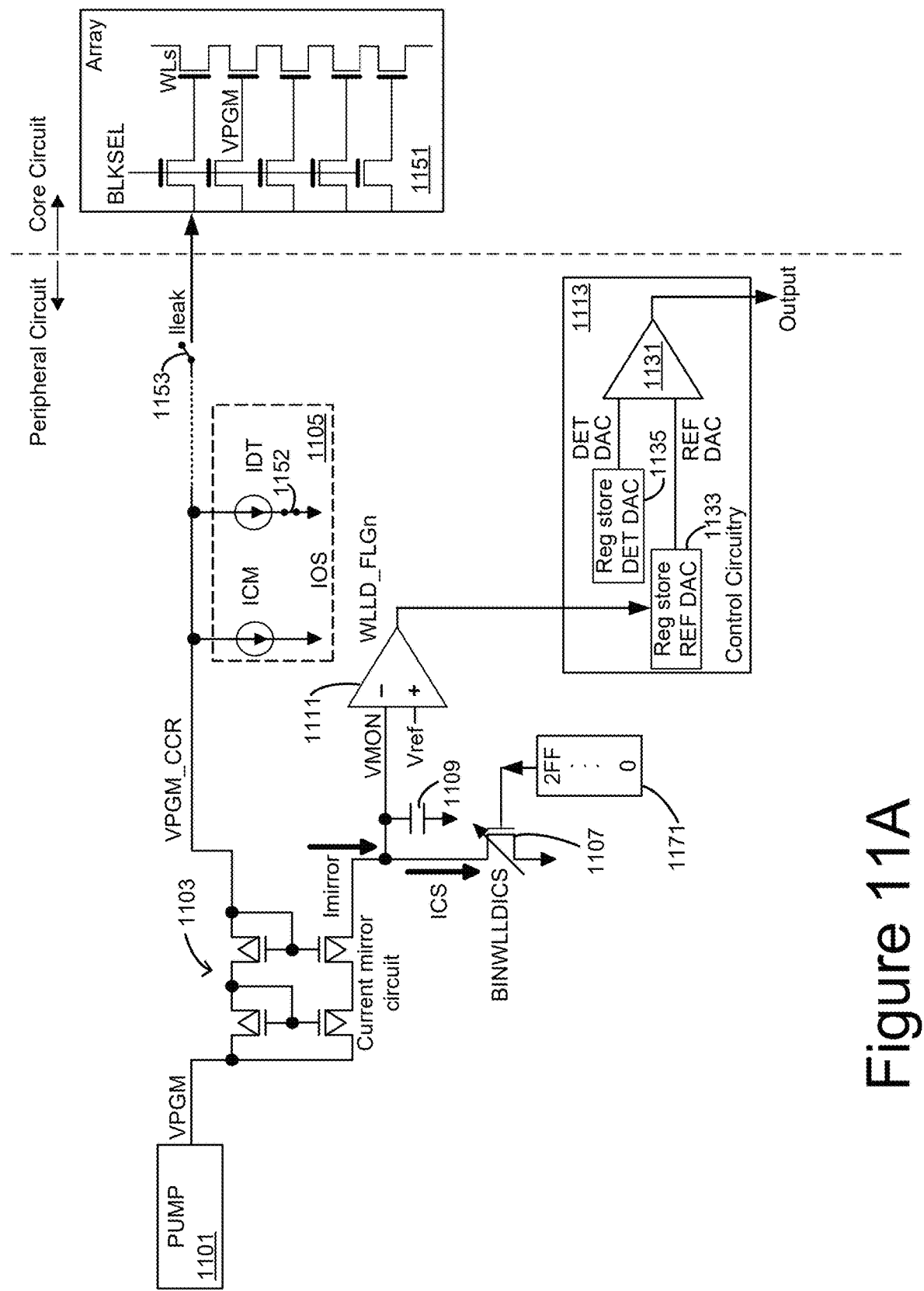
FIGS. 11A, 11B and 12 are respectively embodiments of a schematic representation of a circuit to detect word line leakage and a set of waveforms for the circuit.
Figure 11B:
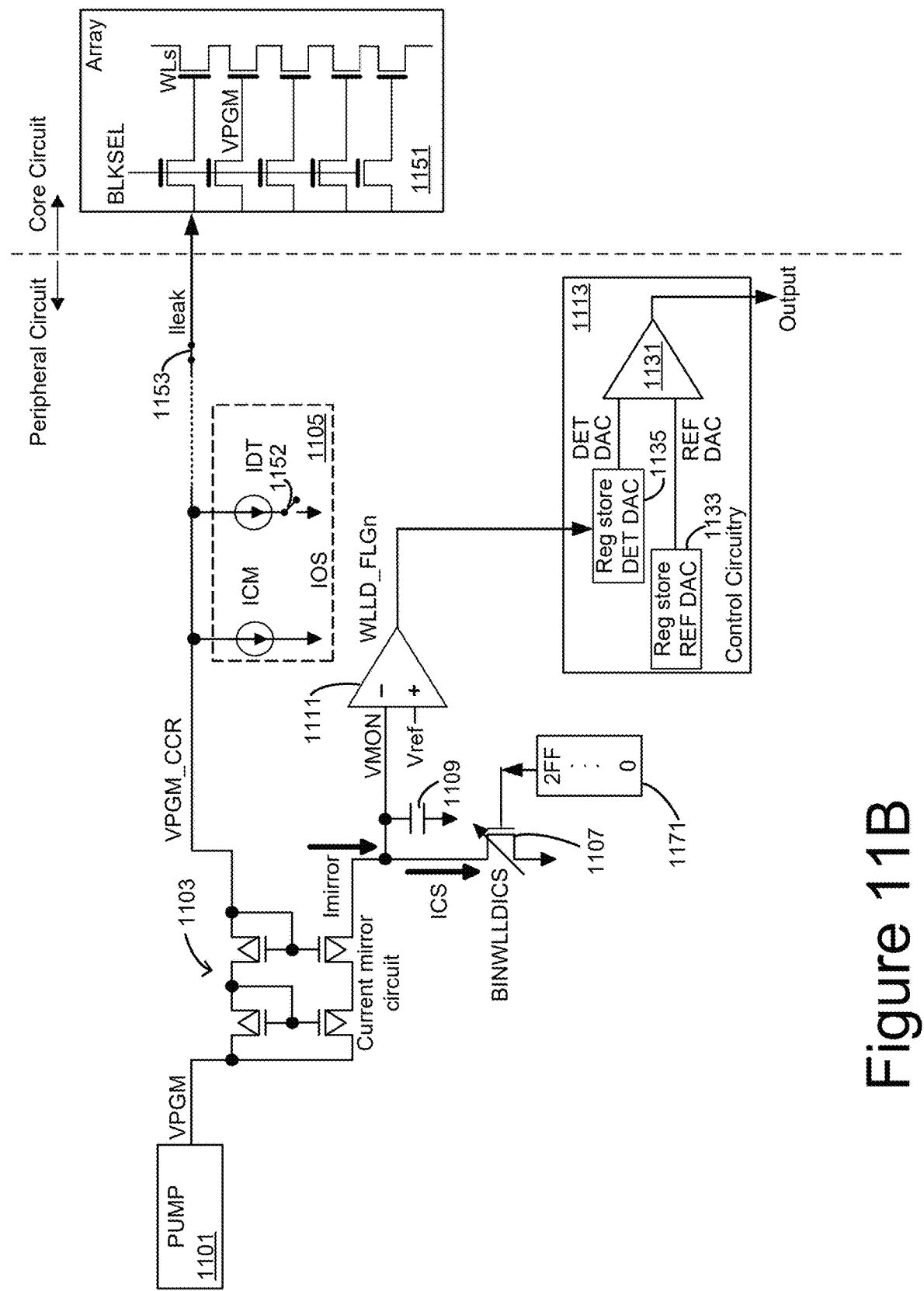
Figure 12:
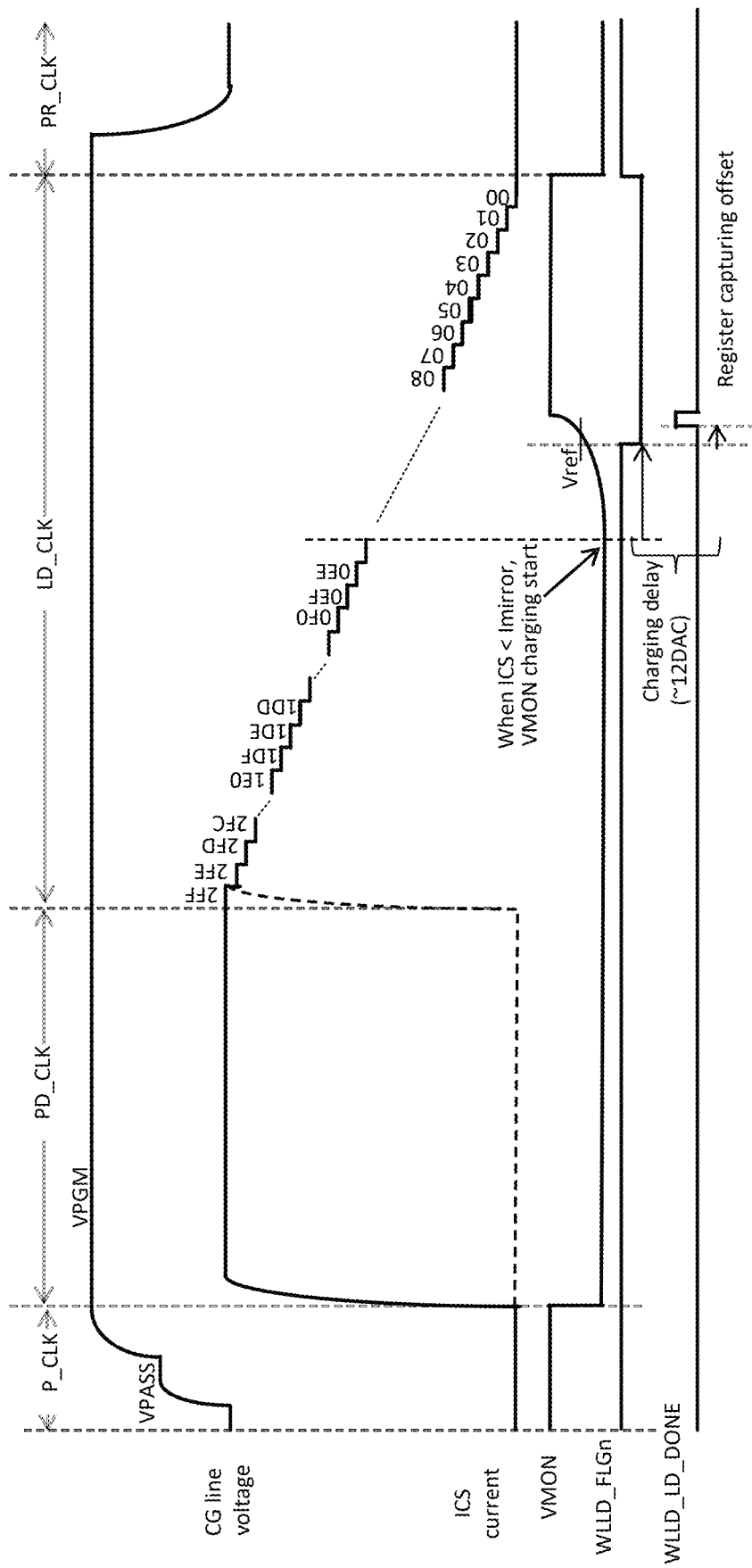

FIGS. 11A, 11B and 12 are respectively embodiments of a schematic representation of a circuit to detect word line leakage and a set of waveforms for the circuit. The elements of FIGS. 11A, 11B include an array 1151 that is part of the core circuit of the memory, such as part of memory structure 202, and the peripheral circuit, such as control circuit 211 or the control circuit elements of the memory die 200. The array 1151 is represented schematically as a portion of a NAND string whose elements are connected along word lines through block select (BLKSEL) switches to receive voltage levels, such as the program voltage VPGM used during stress as shown on one of the word lines, from the peripheral circuit. (Here the block select switches are shown as part of array 1151, but in other cases for a control die/memory die embodiment as in FIG. 2B they can be part of control die 211.) On the peripheral circuit, a charge pump 1101 can generate VPGM or other stress voltage that can then be applied by way of the decoding circuitry (not shown) to the array 1151. The additional elements shown for the peripheral circuit include elements representing the various contributions to the current and elements to determine whether the array has excessive word line leakage.

To determine word line leakage, VPGM or other stress voltage can be applied to the array 1151 from the charge pump 1101 to the selected word lines for a stress interval as described with respect to FIGS. 7A-10. The leakage current Ileak due to word line leakage from the array or arrays will be one of the sinks drawing off current from the voltage level being generated by charge pump 1101. These other currents are represented in the offset current block IOS 1105, including current sources for a common mode current ICM that will be the amount of current normally drawn in device operation and a detection current IDT that will be used by the device during leak detection by the leak detection circuitry to determine a baseline leakage, but that is not part of the word line leakage. For example, the current IDT would include the other peripheral circuit element that are used for leakage detection and only activated during a word line leakage test to determine a baseline leakage when the array is not defective.

With respect to the elements that are added circuitry to determine Ileak, rather than measure Ileak directly, a current mirror circuit is used to generate a current Imirror that will be proportional to the current due to IOS 1105 and Ileak, but can be of a lower amplitude. For the main leg of the mirror a pair of diode connected transistors (PMOSs in this embodiment) are connected to receive the pump voltage VPGM_CCR to the array. The control gate of each of the diode connected transistors are connected to the control gate of a corresponding transistor in the mirroring leg, which provides the mirrored current Imirror. The relative current amplitudes between the two legs corresponds to the relative sizing of the transistors in the two legs, allowing for a relatively small, but proportional, Imirror value to be used.

The current mirror 1103 supplies the mirror current Imirror to a node that connects to a first input (here the − node) of comparator 1111 at a voltage level VMON, where the other input of comparator 1111 (here+) is connected to receive a reference voltage Vref. A capacitor 1109 that can accumulate the charge supplied from Imirror is also connected to the node of the − input of comparator 1111. Also attached at the node connected to the − input of the comparator 1111 is an adjustable current source BINWLLDICS 1107 that drains current off of the upper plate of the capacitor 1109 to ground by the current ICS. In this embodiment, BINWLLDICS 1107 is implemented as a DAC (digital to analog converter) with values running from 2FF to 0 from ICS control circuitry 1171 to receive the input that is then applied as a gate voltage to BINWLLDICS 1107 to generate the corresponding ICS value. The control circuitry 1113 can be part of the system control logic 260. The control circuitry 1113 also receives the output WLLD_FLGn of comparator 1111 that, as explained in more detail with respect to FIG. 12, acts as a leak detection flag.

The control circuitry 1113 will also include registers 1133 and 1135 to respectively hold the determined parameter values for the baseline and the leak detection operation and logic circuitry such as comparator 1131 to perform the comparison between the baseline and the leak detection operation parameter used to determine whether the Ileak value indicates a defective device. The control circuitry 1113 can also control (connection not shown) the switches 1152 and 1153 for use to determine baseline and leakage current values.

FIG. 11A illustrates the switches configured to determine a baseline reference value for current, with switch 1152 closed and switch 1153 open. This disconnects the array 1151 from the detection circuitry and connects the detection current IDT. The current ICS is decreased incrementally from the 2FF DAC value to 0, until the flag WLLD_FLGn flips and the corresponding DAC value saved in the register Reg store REF DAC 1133 to provide the base line REF DAC value.

FIG. 11B illustrates the switches configured to determine the leakage current Ileak value for the array 1151, with switch 1152 open and switch 1153 closed. This disconnects the current IDT from the detection circuitry and connects the array 1151. The current ICS is decreased incrementally from the 2FF DAC value to 0, until the flag WLLD_FLGn flips and the corresponding DAC value saved in the register Reg store DET DAC 1135 to provide the detected leakage DET DAC value. The reference value REF DAC and leakage value DET DAC in comparator 1131, to provide an output that used to determine the amount of leakage from the array in response to a stress mode.

FIG. 12 illustrates some of the waveforms for the circuitry of FIGS. 11A and 11B in a leak detection process. At top is shown the control gate voltage levels, similarly to that seen in FIG. 10. Relative to FIG. 10, the additional leak detection stress clock time (LD_CLK) and, consequently, the time that VPGM voltage is applied is less. Below the CG Voltage waveform is the ICS level, the voltage VMON on the first input of the comparator 1111, and the output WLLD_FLGn of the comparator 1111 that is then captured for the register 1133 or 1135.

During a baseline or leak detection mode, the pump 1101 will supply the high stress voltage to the selected word lines of the array 1151 with the switches 1152 and 1153 set accordingly. The current drawn, including the leak current Ileak to the array 1151 in detection mode, will be mirrored to the detection module by a current mirror circuit 1103. The ICS value from the ICS control circuit starts high, corresponding to the highest digital value of 2FF for this embodiment the current source BINWLLDICS 1107, and stays at the high value during the PD_CLK duration. The VMON level is initially high before ICS starts at its high level, but once ICS is on at the 2FF level VMON is taken low. The output of the comparator 1111 of WLLD_FLGn is initially high. After the initial stress during the PD_CLK phase, in the LD_CLK phase ICS is decreased a step at a time as the digital value of BINWLLDICS decreases once leak detection starts. Once ICS drops to less than Imirror, Vmon will start to charge up. After a few more further DAC steps, Vmon will continue to be charged up, eventually becoming larger than Vref, thus making the WLLD_FLGn flip and the control circuitry will record the DAC value which represents the level of Imirror, in turn allowing determination of Ileak.

Defects such as word line to word line, word line to memory hole, and word line to local interconnect shorts are common in NAND memory structures and can lead to function fails, such as erase, program, and read operations. Leak detection tests, such as those described above, can be incorporated into the production test flow for the devices to test for the multiple failure modes. These tests can consume a lot of test time, including a significant proportion of the total test time for the devices. The following presents embodiments for a self-learning leak detection algorithm and circuit for more efficient leak detection testing.

Figures 13A, 13B:
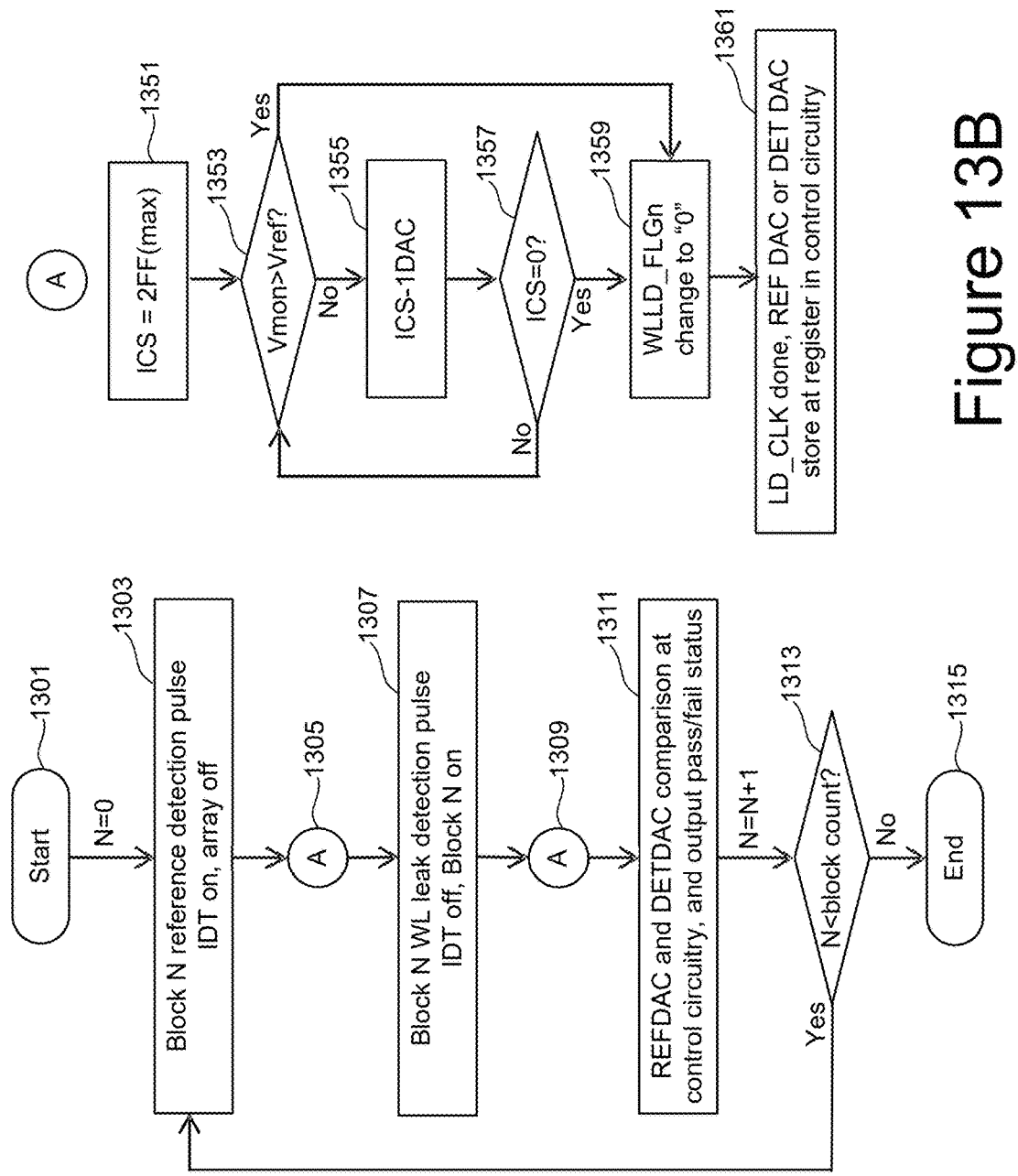
FIGS. 13A and 13B are a flowchart for an embodiment of a built-in self-test operation for word line leakage detection based on the embodiment of FIGS. 11A, 11B, and 12.

As described above with respect to FIGS. 11A-12, for each block there are two pulses used in these embodiments, with a reference detection pulse and a word line leak detection pulse. As discussed with respect to FIG. 11A, for the reference detection pulse, array is disconnected and the process detects a background current (Iref). As discussed with respect to FIG. 11B, for the word line leak detection the pulse connects to the array and word lines to measure the actual leakage (Idet) on top of the baseline level. As discussed above, for both FIGS. 11A and 11B, the array is biased according to the particular test mode based the kind of leakage being measured during the period LD_CLK of FIG. 12, with the ICS current level sweeping from the maximum DAC value (2FF in the example of FIG. 12) to the 0 DAC value. Once ICS lower than Iref or Idet, Vmon will charge up and when Vmon higher than Vref, the output of the comparator at WLLD circuit is set to "1", WLLD_FLGn 1111 is set low and DAC value corresponding to Iref or Idet is generated and stored in the corresponding register 1133 or 1135. In a standard Built-In Self-Test (BIST) leak detection operation based on FIGS. 11A-12, the BIST leak detection tests the reference detection test uses both a reference detection pulse and word line leak detection pulse block by block until all blocks from the die are tested, with a comparison of REF DAC and DET DAC for each block to determine an output pass or fail status. FIGS. 13A and 13B illustrate such an embodiment.

FIGS. 13A and 13B are a flowchart for an embodiment of a built-in self-test operation for word line leakage detection based on the embodiment of FIGS. 11A, 11B, and 12. This can be performed as a BIST controlled by the control circuitry 1113. The flow starts at 1301 with the block number N initialized to N=0. At step 1303, a detection pulse for the current block is applied with IDT on and the array cut off by respective switches 1152 and 1153 as illustrated in FIG. 11A. At step 1305 (A) the pulse is applied as illustrated in FIG. 12 using the detail for (A) of FIG. 13B. In this embodiment, at step 1351 the applied ICS starts at the maximum IDS DAC value of 2FF. Step 1353 compares Vmon to Vref and, if mon is less than Vref, the value of ICS is decreased by one DAC step at 1355. The decremented value of ICS is checked at step 1357 to see whether it has reached ICS=0 and, if not, the flow loops back to step 1353 to compare the current value of Vmon to Vref. This loop continues until either Vmon>Vref at step 1353 or ICS=0 at step 1357. In either case, the flow goes to step 1359 with the flag WLLD_FLGn changed to 0. At step 1361, the LD_CLK clock finishes and the value of REF DAC is stored in register 1133 (at step 1305) or the value of DET DAC is stored in register 1135 (for step 1309).

Leak detection follows at step 1307 with the array biased for the Ileak current test during the PD_CLK interval applied to the array with IDT cut off and the array connected by respective switches 1152 and 1153 as illustrated in FIG. 11B. At step 1309 (A) the pulse is applied as illustrated in FIG. 12 using the detail for (A) of FIG. 13B, where the same flow is again used, aside from the register in which the result is stored in step 1361. Step 1311 then compares the determined REF DAC and DET DAC values in comparator 1131 and a corresponding status of pass or fail output for the block. The block count is the incremented and checked at step 1313 to see whether there are more blocks to check and, if so, the flow loops back to step 1303 for the incremented block count. If all blocks have been checked, the flow ends at 1315. Note that under the arrangement of FIGS. 13A and 13B, each block undergoes a REF DAC and DET DAC determination using the full DAC maximum to DAC 0 values, which is a time consuming process.

To improve the efficiency of the BIST process and reduce test times, the following embodiments introduce a self-learning leak detection algorithm and corresponding circuitry. In these embodiments, during leakage testing the ICS sweeping DAC range is reduced to a smaller range around a reference value of REF DAC of REF DAC+m to REF DAC−n. Additionally, a new algorithm is used to test leak detection, with only one reference detection pulse for a group of multiple blocks, as illustrated by the flow of FIGS. 14A and 14B.

Figure 14A:
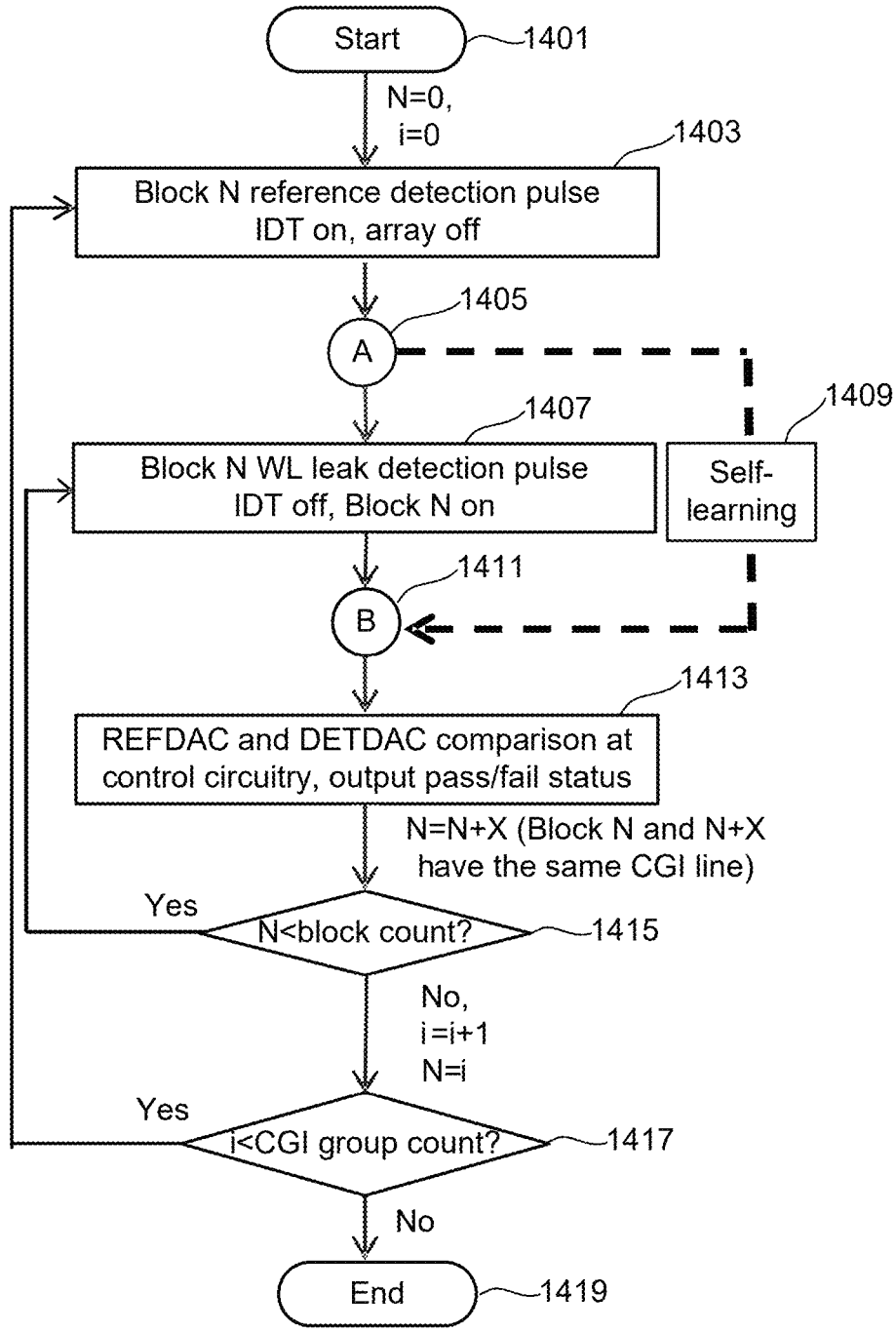
FIGS. 14A and 14B are a flowchart for an embodiment of a built-in self-test operation for word line leakage detection with self-learning.
Figure 14B:
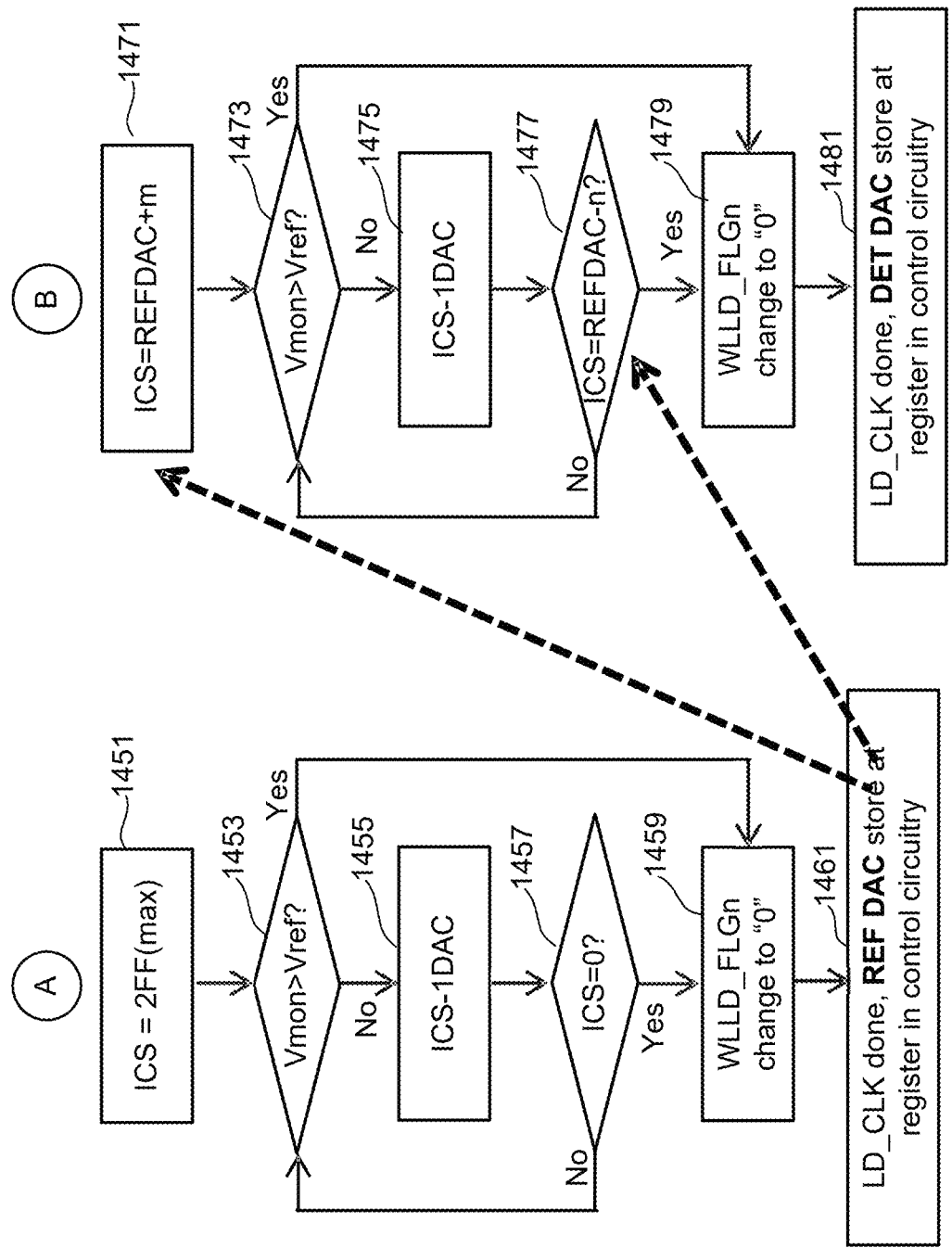

FIGS. 14A and 14B are a flowchart for an embodiment of a built-in self-test operation for word line leakage detection with self-learning. The flow begins at step 1401 with the block count N withing a group is initialized to 0, as in FIG. 13A, but also with a group count i initialized to 0. In the embodiments presented here, the blocks of a plane are broken up into groups of physically continuous blocks on the memory die. In the examples presented here, i is the index of a block within a group and each of the groups have the same size, although more generally the size can vary between groups. For example, if certain regions of a die are more prone to defects due to process variations, a smaller group size could be used in such regions. By selecting the groups of blocks to be physically contiguous on a die, the blocks of the group will have, for non-defective blocks, similar properties as processing variations should be relatively similar across a group. In the example here, the groups will be based on the granularity of the decoding of word line signals applied to the control gates of the memory cells. Here these are referred to CGI groups based on blocks that receive a commonly multiplexed word line voltage levels. Steps 1403 and 1405 then follow as in FIG. 13A and, for the detail of step 1405 (A), the detail of FIG. 14A at steps 1451-1461 that correspond to steps 1351-1361 of FIG. 13A. In the embodiment of FIG. 14A, the reference value determined in steps 1403 and 1405 for the first block of a group, but more generally another block of a group can be used with appropriate changes to the incrementing of values in the loops of FIG. 14A. In any case, the REF DAC value determined in steps 1403 and 1405 will establish the value for the block group.

Once the REF DAC value of a block group is determined, this value is used for determining the DET DAC value for each of the blocks of the group. Steps 1407 and 1411 are largely the same as steps 1307 and 1309 of FIG. 13A, except for in the detail of step 1411 (B) of FIG. 14B differs in the range of DAC values used for the DET DAC value of the block being tested for each block group. More specifically, the sub-flow (B) of step 1411 on the right hand side of FIG. 14B now begins, at step 1471, with the REF DAC value determined in steps 1403 and 1405, offset upward by m DAC steps. Steps 1473 and 1475 are as in steps 1353 and 1355 of FIG. 13B, but now the comparison at step 1477 for ICS is not for 0, but for REF DAC offset lower by n DAC increments. Steps 1479 and 1481 can be as described above with respect to steps 1359 and 1361.

FIG. 1409 also includes self-learning block 1409, which is not a step in itself but encapsulates the self-learning of steps 1405, 1407, and 1411. The self-learning can include the determination the REF DAC value for each set of blocks, which is then used in setting range the range of DAC values used in steps 1471, 1473, 1475, and 1477.

Step 1413 compares the REF DAC value with the DET DAC value to determine the pass/fail output for the current block, where this can be performed as in step 1311 by the control circuitry 1113. Step 1413 differs from step 1311 in that, although the DET DAC value will be that determined for the current block, all blocks of a block group will use the same REF DAC value. Consequently, the flow of FIG. 14A has an inner loop, in which the blocks of the current group are tested, and an output loop, which increments the group. After step 1413, the N value is incremented to N=N+X, where X is based on the group size such that N and N+X are in the same group (i.e., same CGI line group). The N value is then checked at step 1415 against the block count value for the groups and, if less than the value, the flow loops back to step 1407 for the next block of the group. If instead all of the blocks of a group are found to have been checked, i is incremented to i+1 and N is set to i, with the value i checked at step 1417 to see whether all of the block groups have been checked: if not, the flow loops back to step 1403 to determine the DAC REF value for the new group; and, if so, the flow ends at 1419.

In the approach based on FIGS. 11A-13B, the LD_CLK time of FIG. 12 depends on the ICS setting and WLLD_FLG changing time. In FIG. 12, ICS steps from a high of the maximum DAC value (here 2FF) to the minimum DAC value (0), which can take a relatively long time and results in a long LD_CLK value. As the pass/fail status is determined based on a comparison. Since we compare REF DAC and DET DAC to get pass/fail status, at leak detection pulse, the self-learning WLLD algorithm and corresponding circuitry can reduce test time by reducing the range of DAC values used to determine a block's DET DAC value, as illustrated by FIG. 15.

Figure 15:
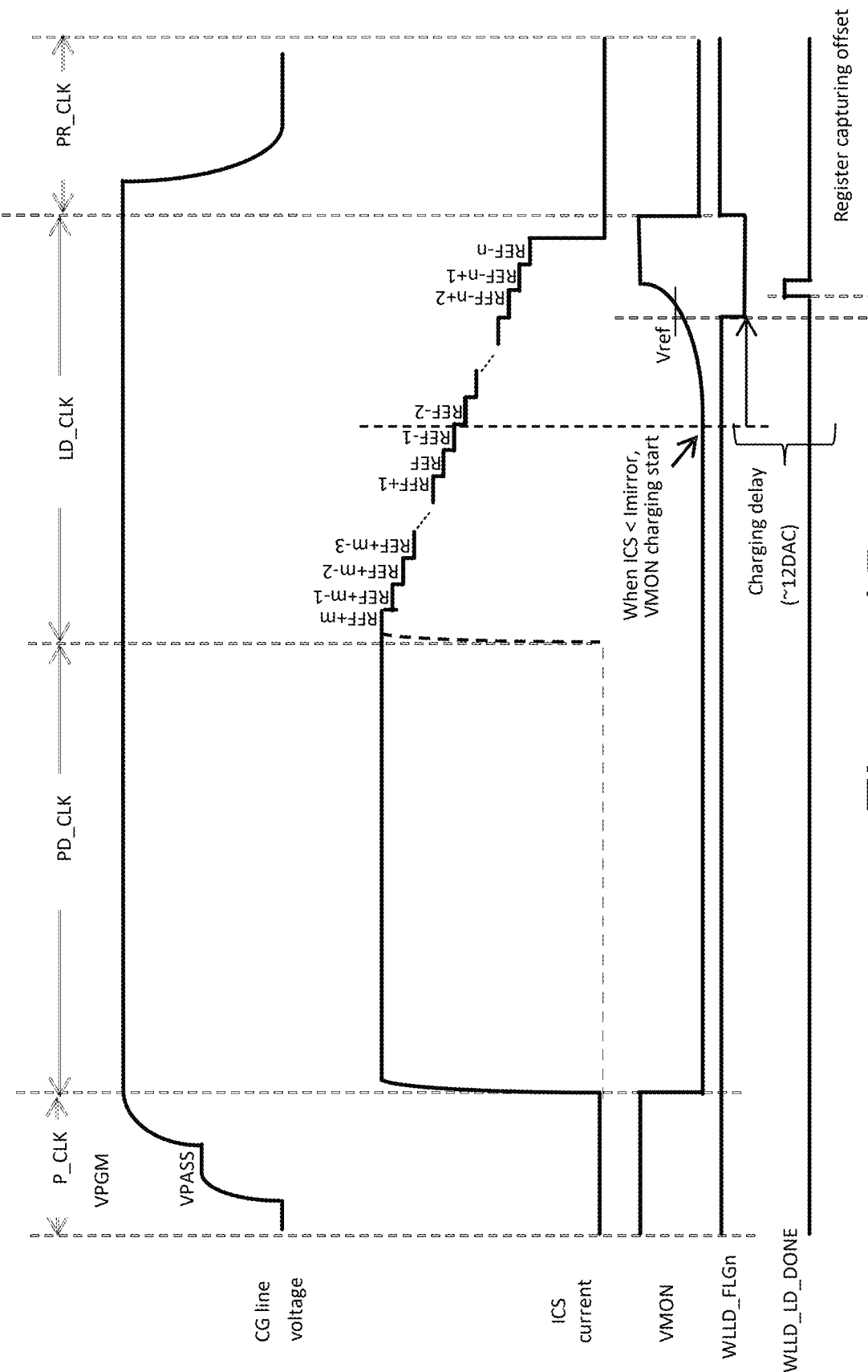
FIG. 15 is an embodiment of waveforms for the detection phase of self-learning BIST leak detection.

FIG. 15 is an embodiment of waveforms for the detection phase of self-learning BIST leak detection. The waveforms of FIG. 15 are arranged as in FIG. 12, which can still be used to determine the REF DAC value, but now the ICS current waveform to determine leakage detection value DET DAC runs over a reduced range. The ICS current waveform range is based on the REF DAC value (REF) of the reference block for the current test block's group, running from an offset of m steps above (REF+m) to n steps below (REF−n). This approach can significantly reduce the duration of the LD_CLK and improve test times. The embodiments here use a monotonically decreasing sequence of digital values for the ICS current steps of FIG. 12 and its proper sub-set (i.e., less than all of the full set) of digital ICS current steps of FIG. 15, but alternate embodiments can use a monotonically increasing series of digital value for one or both cases.

Figure 16A:
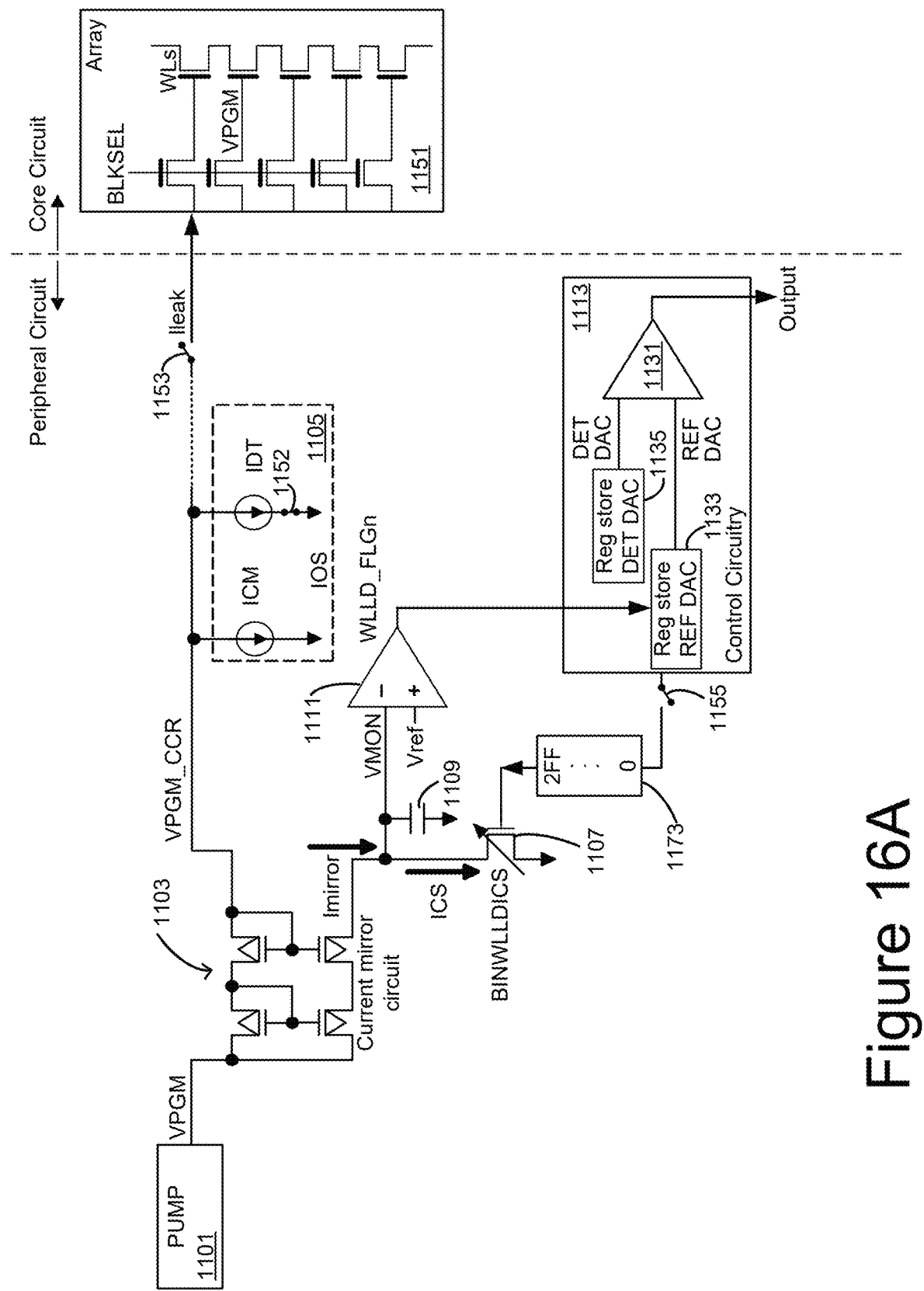
FIGS. 16A and 16B illustrate an embodiment of BIST leak detection circuitry for determination of the reference DAC value and detection DAC value, respectively, that incorporate the waveforms of FIG. 15.
Figure 16B:
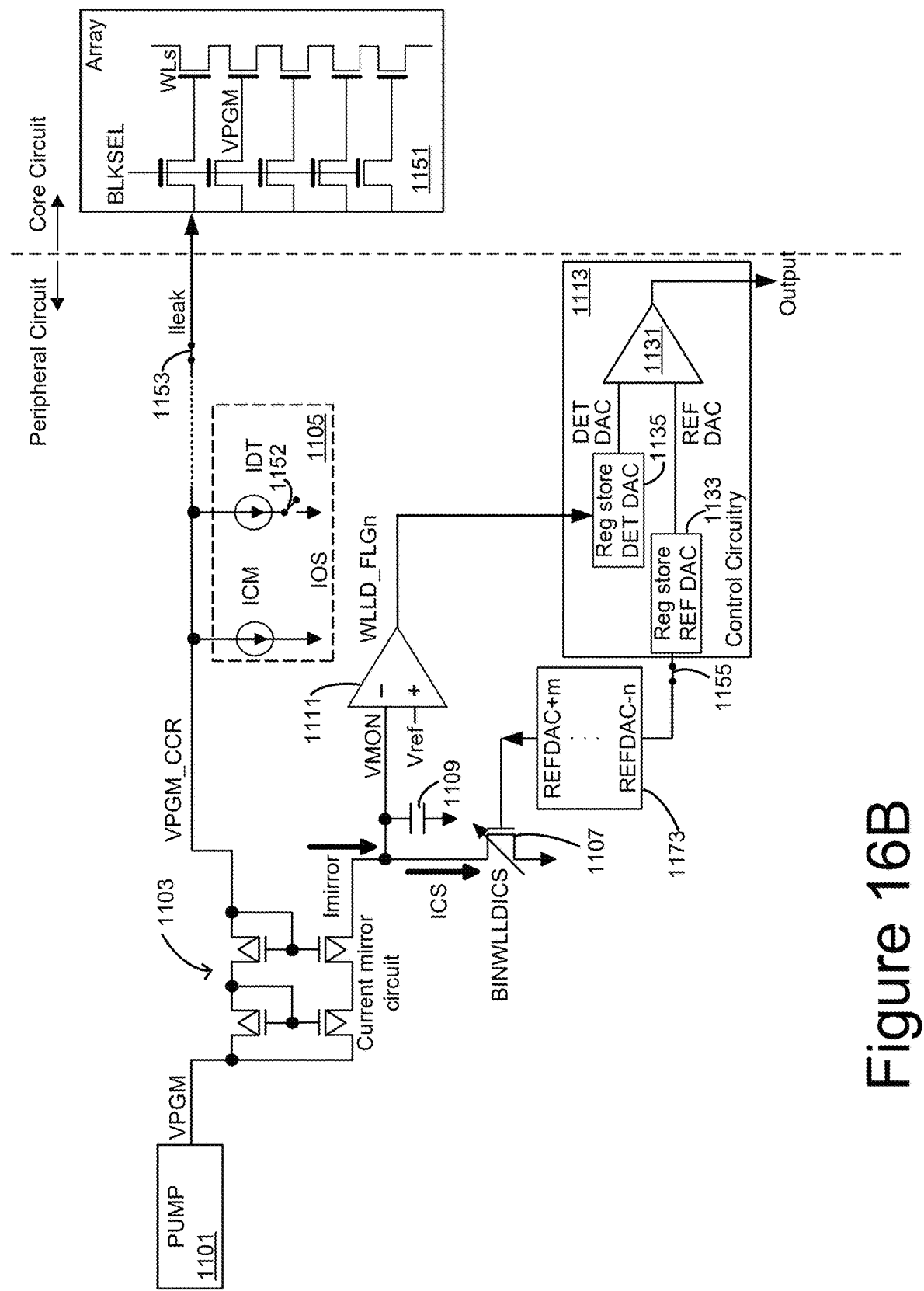

FIGS. 16A and 16B illustrate an embodiment of BIST leak detection circuitry for determination of the reference DAC value and detection DAC value, respectively, that incorporate the waveforms of FIG. 15. FIGS. 16A and 16B respectively correspond to FIGS. 11A and 11B and are similarly numbered, but now include an additional communication module between register stored REF DAC of the ICS control circuit 1173 and control circuitry 1113, as represented in FIGS. 16A and 16B by the path including switch 1155 that can be controlled by the control circuitry 1113. For the detection pulse, the circuitry is configured as in FIG. 16A with switch 1152, switch 1153 off to disconnect the array 1151, and 1155 off. The pulse is the same as in FIG. 12 with the full DAC range of 2FF to 0 from ICS control circuit 1173 used, and the process the same as described with respect to FIGS. 11A and 12. This establishes the reference value REF DAC for the group.

For determining a block's leak detection value DET DAC, the circuit is configured as in FIG. 16B with IDT switch 1152 off, switch 1153 on to connect the array, and switch 1155 on to enable the reduced DAC range from ICS control circuit 1173 of REF DAC+m to REF DAC−n of the pulse in FIG. 15. The REF DAC is known from the previous reference detection pulse test. The parameters m and n can be set by a user, such as determined as part of device characterization tests, where m can be set to a larger value if there is delay between the ICS trigger and the output of the comparator set to "1". If the block has high leakage (fail block), DET DAC will output as REF DAC+m, which is larger than REF DAC, giving a output status of fail. If the block has little leakage (pass block), REF DAC−n will not trigger WLLD_FLG at comparator 1111, and ICS will drop to 0 directly, where the circuit internally is set to trigger. The DET DAC will output as 0, which is smaller than REF DAC and will result in an output status of pass. With this self-learning WLLD circuitry of FIGS. 15-16B using the algorithm of FIGS. 14A and 14B, the accuracy of the BIST leak detection pass/fail status will not be sacrificed.

Concerning the values of m and n, m and n can be determined by parameter control, which can be set by user based device characterization tests, for example, and stored in storage 266 of the control circuitry. The m, n values determine the leak detection test time (LD_CLK). In an ideal case, these could be set m=n=0, but in a practical application these can be set to cover a wider ICS range to account for delay between the ICS trigger and the output of the comparator set to "1". For example, if the delay is ~12 DAC, then can set m=12, n=0. In general, smaller m, n can save more test time.

As described with respect to FIGS. 15-16B, the reduction of the number of test levels used when determining whether a block suffers from word line leakage can significantly reduce test times. In an additional aspect, as noted in the flows of FIGS. 14A and 14B test times can further reduced by reducing the number of tests for reference values by testing a reference value for only one block of a group of blocks, where these aspects can be used together or separately. The discussion now considers this additional aspect in more detail.

Figure 17:
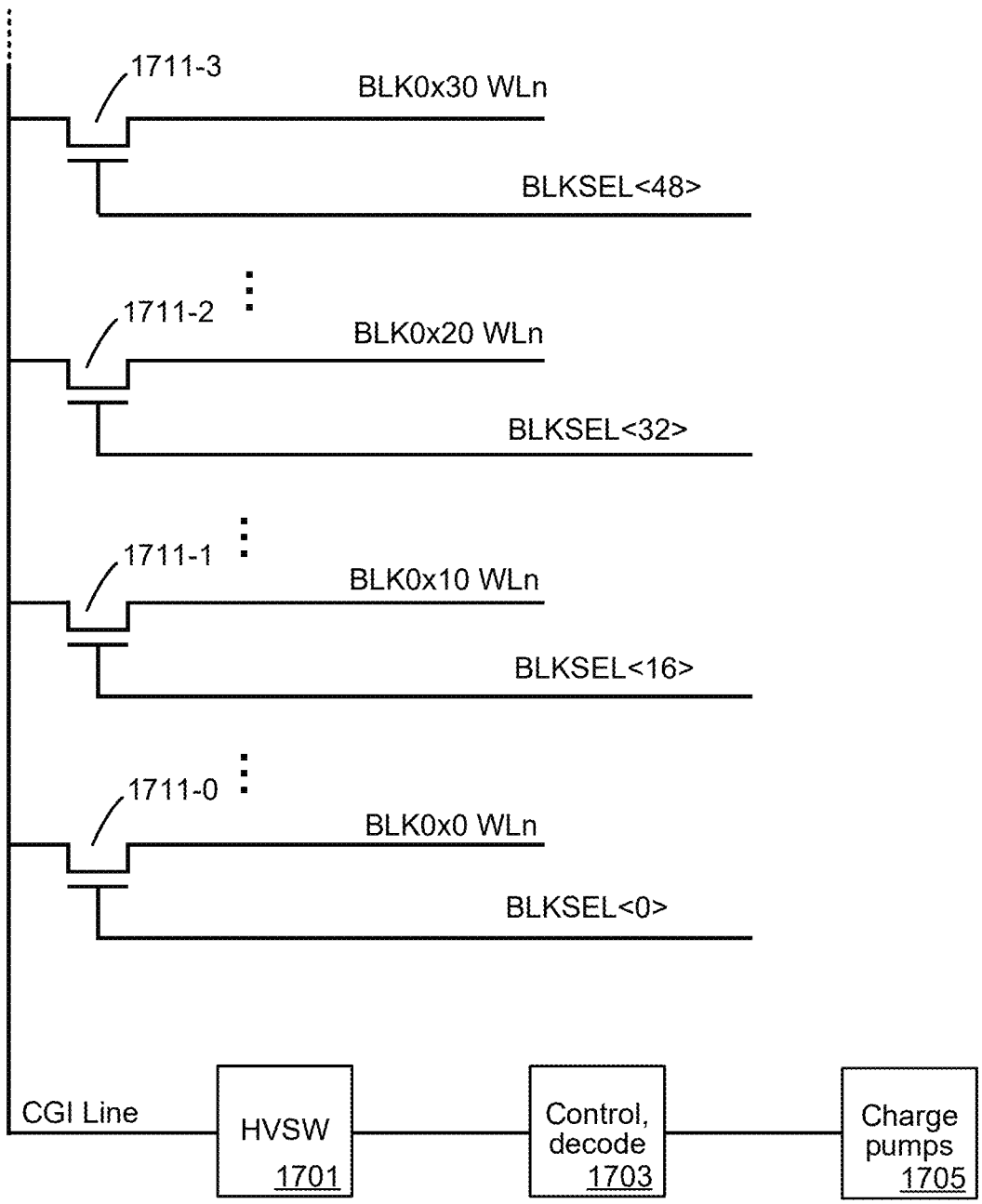
FIG. 17 is a schematic representation of different levels of block decoding and blocks supplied from a shared set of switches and voltage sources.

In a more traditional approach to BIST leak detection, such as described with respect to FIGS. 11A-13B, a leakage test is performed to determine both of REF DAC and DET DAC on a block by block basis. However, the reference value REF DAC is often not directly related to an individual block address as the block is disconnected when test for REF DAC is performed. Consequently, groups of blocks that share a common set of drivers and decoders at the block level will often see only very small variation in reference leakage levels. In the block select process of a NAND memory, there are typically a number of levels of decoding and multiplexing by which charge pumps and other voltage supplies are provided to the blocks by way of switches and drivers. FIG. 17 illustrates some embodiments for arrangement of these elements.

FIG. 17 is a schematic representation of different levels of block decoding and blocks supplied from a shared set of switches and voltage sources. A representative word line WLn is shown for each block of a group of several blocks. The word lines of each of these blocks is supplied with a bias level from a common CGI line through a corresponding block select gate 1711-*i* with a corresponding block select control signal, where here i the block number. The CGI line will provide a voltage based on the operation being performed, such as selected and unselected word line voltages for read or verify operations, programming operations, and erase operation. The voltage levels are generated in charge pumps 1705 or other voltage supplies and then pass through several levels of multiplexers/decoders that act as drivers for the word lines. These different levels of decoding are represented by the control, decode circuitry block 1703 and high voltage switches HVSW 1701. Referring back to FIGS. 2A and 2B, in one arrangement the charge pumps 1705 can be considered part of power control block 264, the control, decode circuitry block 1703 can be considered part of system control logic 260, and the high voltage switches HVSW 1701 part of row control circuitry 220, including row decoder 222 and array drivers 224, with the block select signal from block select circuitry 226.

In order to select a particular block and connect the local word lines of a block to the voltage supplies such as the charge pumps 1705, the local word lines are first connected to the CGI lines through the word line pass gates 1711-*i*. Multi-blocks share a common CGI line and these blocks here called "CGI group blocks". For example, in FIG. 17 BLK0x0, 0x10, 0x20, . . . are one "CGI group blocks". As they share same periphery circuit, REF DAC for one group blocks should typically be the same or at least very close. If variations between different blocks of a CGI group are acceptable, the process can detect REF DAC for only one block of a CGI group, greatly reducing test times.

The example embodiments presented here are based on the CGI group for the determination of a single reference leakage REF DAC value for comparison with the detection DET DAC values of the individual members of the group, with the reference determination block being the first block of the group, but other embodiments can use different arrangements with appropriate changes to the algorithms. For example, different memory devices can use different decoding arrangements, so that the block group can be based on decoding structures and hierarchy of a particular device. In other variations, multiple, but less than all of the, blocks of a group can be used as the representative blocks for determining reference leakage level. In other cases, the reference test blocks could be distribution differently across a die to account for variations in process or selected on a random basis.

The algorithm of the flow of FIGS. 14A and 14B has only one reference detection pulse per CGI block group and tests for the DET DAC block by block for the blocks of the group using the same reference value. The REF DAC value will not be changed until another reference detection pulse is performed. The REF DAC value is stored at register 1133 and maintained for use with all blocks of the group, such as to power down. Once the REF DAC of a group is determined and stored in register 1133 in can then be compared in comparator 1131 with the DET DAC values for each block of the group from register 1135, outputting the corresponding pass or fail status. This can greatly accelerate the test process since, to take an example of a die with 3200 blocks and 16 CGI groups, this can reduce the number of reference test from 2×3200=6,400 to 16+3200, or essentially in half. This can be illustrated with respect to the FIGS. 18 and 19.

FIGS. 18 and 19 present a test algorithm comparison between a traditional BIST leak detection of FIGS. 13A and 13B and the embodiment of FIGS. 14A and 14B. Each of FIGS. 18 and 19 has three columns, corresponding to block number (BLK), whether it is a reference or leak determination test (REF/DET), and which register the result is stored in (REF DAC 1133 or DET DAC 1135). The stippled rows correspond to determination of a reference value and the non-stippled rows to a leakage determination. The comparison of the two DAC values in comparator 1131 is represented by the arrows along the right side of the figures.

Under the algorithm of FIGS. 11A and 11B and illustrated in FIG. 18, each block has both of a reference value and leakage value determined. The process begins with a first block address of the plane or die and measures both the REF DAC and DET DAC value for the block, which are then compared to determine the block's status. This process then continues block by block until complete.

Under the algorithm of FIGS. 14A and 14B and illustrated in FIG. 19, cach block has a leak value determined, but only one block for a given CGI group is used to determine a reference value. For example, for the group of blocks of addresses 0x0 to 0xC70, block 0x0 is measured for the REF DAC value of the group. All of the blocks of the group are then measured for their leakage value DET DAC and compared to the 0x0 reference value to determine the block's pass/fail status. Once all the blocks of the group have been test, the flow moves on to the next group, here of blocks 0x1 to 0xC71, measures the reference level for block 0x1, and measures and compares with this reference values the leakage value for all the blocks of the group. The process continues on in this way for all of the groups. Comparing FIGS. 18 and 19, it can be seen that the total number of tests is reduced to by almost 50%. As the test waveform of FIG. 15 also reduces the time for leakage testing each of the blocks, this can typically reduce the test time by around 10% or so. Consequently, the combination of these techniques can reduce leakage detection test time by around 60%.

The foregoing embodiments provide a self-learning BIST leak detection circuit with only one reference detection pulse for each group blocks to reduce test time. For all leak detection test modes, test times can be significantly reduced, significantly saving on costs at production tests without sacrificing the accuracy of BIST leak detection pass/fail status.

In view of the foregoing, a first embodiment is a non-volatile memory system comprising a control circuit configured to connect to an array comprising a first plurality of blocks of non-volatile memory cells. The control circuit comprises: bias circuitry configured to selectively bias the first plurality of blocks for memory operations, including testing for current leakage; and built-in self-test circuitry to test for current leakage from the first plurality of blocks, where, to test for current leakage in the array. The built-in self-test circuitry is configured to: with the bias circuitry configured to perform a leak test on a first of the first plurality of blocks, but disconnected from the first block, determine a first reference current value for the first block by comparing a current drawn with a sequence of comparison current values; with the bias circuitry configured to perform a leak test on the first block and connected to the first block, determine a leakage current value for the first block by comparing a current drawn with a first sub-sequence of comparison current values, the first sub-sequence formed of a sequence between the determined first reference current value offset upward by a first offset number of comparison current values and the determined first reference current value offset downward by a second offset number of comparison current values, the first sub-sequence of comparison values being a proper subset of the sequence of comparison current values; compare the first reference current value for the first block with the determined leakage current value for the first block; and based on comparing the first reference current value for the first block with the determined leakage current value for the first block, determine whether the first block is defective.

One embodiment includes a method comprising: determining, for a first block of each of a plurality of groups of blocks of an array of non-volatile memory cells of a non-volatile memory device, a corresponding reference current value by: with biasing circuitry of the memory device configured to perform a leakage test on, but while disconnected from the memory cells of, the first block, comparing a resultant current level with a first sequence of comparison voltage level each corresponding to one of a first sequence of digital values; and based on the comparison of the resultant current level with the first sequence of comparison voltage level, determining a digital value for the corresponding reference current value of the group of blocks. The method also includes determining, for each block of each of the plurality of groups of blocks, a corresponding leakage current value by, for each group of blocks: with the biasing circuitry of the memory device connected to memory cells of, and configured to perform a leakage test on, the block, comparing a resultant current level with a second sequence of comparison voltage level each corresponding to one of a second sequence of digital values; and based on the comparison of the resultant current level with the second sequence of comparison voltage level, determining a digital value for the corresponding leakage current value of the block. The method further includes determining, for each block of each of the plurality of groups of blocks, either a pass status or a fail status by, for each group of blocks: comparing the digital value for the corresponding leakage current value of the block with the digital value for the corresponding reference current value of the group of blocks.

One embodiment includes a non-volatile storage system comprising: an array of non-volatile memory comprising a plurality of groups of blocks of non-volatile memory cells; and one or more control circuits connected to the array, comprising: biasing circuitry configured to selectively bias the blocks for memory operations, including testing for current leakage, including a separate set of switches for supplying voltage levels for each group of blocks; built-in self-test circuitry, where to perform current leakage testing on the blocks. The built-in self-test circuitry is configured to: determine, for a first block of each of a plurality of groups, a corresponding reference current value by: with the biasing circuitry configured to perform a leakage test on, but while disconnected from the memory cells of, the first block, comparing a resultant current level with a first sequence of comparison voltage level each corresponding to one of a first sequence of digital values; and based on the comparison of the resultant current level with the first sequence of comparison voltage level, determining a digital value for the corresponding reference current value of the group of blocks; determine, for each block of each of the plurality of groups of blocks, a corresponding leakage current value by, for each group of blocks: with the biasing circuitry connected to memory cells of, and configured to perform a leakage test on, the block, comparing a resultant current level with a second sequence of comparison voltage level each corresponding to one of a second sequence of digital values; and based on the comparison of the resultant current level with the second sequence of comparison voltage level, determining a digital value for the corresponding leakage current value of the block; and determine, for each block of each of the plurality of groups of blocks, either a pass status or a fail status by, for each group of blocks by comparing the digital value for the corresponding leakage current value of the block with the digital value for the corresponding reference current value of the group of blocks.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory system, comprising:
a control circuit configured to connect to an array comprising a plurality of blocks, including a first plurality of blocks, of non-volatile memory cells, the control circuit comprising:
bias circuitry configured to selectively bias the plurality of blocks for memory operations, including testing for current leakage; and
built-in self-test circuitry to test for current leakage from the plurality of blocks, where, to test for current leakage in the array, the built-in self-test circuitry is configured to:
with the bias circuitry configured to perform a leak test on a selected block of the first plurality of blocks, but disconnected from the selected block of the first plurality of blocks, determine a first reference current value for the selected block by comparing a current drawn with a sequence of comparison current values;
with the bias circuitry configured to perform a leak test on the selected block and connected to the selected block, determine a leakage current value for the selected block by comparing a current drawn with a first sub-sequence of comparison current values, the first sub-sequence formed of a sequence between the determined first reference current value offset upward by a first offset number of comparison current values and the determined first reference current value offset downward by a second offset number of comparison current values, the first sub-sequence of comparison values being a proper subset of the sequence of comparison current values;
compare the first reference current value for the selected block with the determined leakage current value for the selected block; and
based on comparing the first reference current value for the selected block with the determined leakage current value for the selected block, determine whether the selected block is defective.

2. The non-volatile memory system of claim 1, wherein the control circuit is formed on a control die, the non-volatile memory system further comprising:
a memory die including the array, the memory die separate from and bonded to the control die.

3. The non-volatile memory system of claim 1, wherein:
the sequence of comparison current values are a set of analog current values corresponding to a monotonic sequence of digital values.

4. The non-volatile memory system of claim 3, wherein:
the sequence of digital values corresponding to the sequence of comparison current values is a monotonically decreasing sequence; and
the first sub-sequence of comparison values is a monotonically decreasing sub-sequence digital values running from a first value offset by a first number of digital values above the digital value corresponding to the reference current to a second value offset by a second number of digital values below the digital value corresponding to the reference current.

5. The non-volatile memory system of claim 4, wherein the first number of digital values and the second number of digital values are user settable.

6. The non-volatile memory system of claim 4, wherein the first number of digital values and the second number of digital values are determined as part of a device characterization process.

7. The non-volatile memory system of claim 1, wherein to test for current leakage in the array, the built-in self-test circuitry is further configured, for each additional block of the first plurality of blocks other than the first block, to:
with the bias circuitry configured to perform a leak test on the additional block and connected to the first additional block, determine a leakage current value for the additional block by comparing a current drawn with the first sub-sequence of comparison current values;
compare the first reference current value for the first block with the determined leakage current value for the additional block; and
based on comparing the first reference current value for the first block with the determined leakage current value for the additional block, determine whether the additional block is defective.

8. The non-volatile memory system of claim 7, wherein the array further comprises one or more second plurality of blocks of non-volatile memory cells, and wherein to test for current leakage in the array, the built-in self-test circuitry is further configured, for each of second plurality of blocks, to:
with the bias circuitry configured to perform a leak test on a reference block of the second plurality of blocks, but disconnected from the reference block, determine a corresponding reference current value for the second plurality of blocks by comparing a current drawn with the sequence of comparison current values; and
for each of blocks of the second plurality of blocks:
with the bias circuitry configured to perform a leak test on the selected block and connected to the selected block, determine a leakage current value for the selected block by comparing a current drawn with a second sub-sequence of comparison current values, the second sub-sequence formed of a sequence between the determined corresponding reference current value offset upward by the first offset number of comparison current values and the determined corresponding reference current value offset downward by the second offset number of comparison current values, the second sub-sequence of comparison values being a proper subset of the sequence of comparison current values;
compare the corresponding reference current value for the second plurality of blocks with the determined leakage current value for the selected block; and
based on comparing the reference current value for the second plurality of blocks with the determined leakage current value for the selected block, determine whether the additional block is defective.

9. The non-volatile memory system of claim 8, wherein the bias circuitry is configured to provide to bias voltages independently to the first plurality of blocks and to each of the one or more second plurality of blocks as a group.

10. The non-volatile memory system of claim 8, further comprising:
the array, wherein each of the first plurality of blocks and each of the one or more second plurality of blocks are a physically contiguous plurality of blocks.

11. The non-volatile memory system of claim 1, further comprising:
the array, wherein the array has a NAND architecture, each of the plurality of blocks comprises a plurality of word lines along which the memory cells, and where the leak test includes a test for word line to word line leakage.

12. The non-volatile memory system of claim 1, further comprising:
the array, wherein the array has a three dimensional NAND architecture in which NAND strings are formed along memory holes, each of the plurality of blocks comprises a plurality of word lines along which the memory cells, and where the leak test includes a test for word line to memory hole leakage.

13. A method, comprising:
determining, for a first block of each of a plurality of groups of blocks of an array of non-volatile memory cells of a non-volatile memory device, a corresponding reference current value by:
with biasing circuitry of the memory device configured to perform a leakage test on, but while disconnected from the memory cells of, the first block, comparing a resultant current level with a first sequence of comparison voltage level each corresponding to one of a first sequence of digital values; and
based on the comparison of the resultant current level with the first sequence of comparison voltage level, determining a digital value for the corresponding reference current value of the group of blocks;
determining, for each block of each of the plurality of groups of blocks, a corresponding leakage current value by, for each group of blocks:
with the biasing circuitry of the memory device connected to memory cells of, and configured to perform a leakage test on, a selected block of the plurality of the groups of blocks, comparing a resultant current level with a second sequence of comparison voltage level each corresponding to one of a second sequence of digital values; and
based on the comparison of the resultant current level with the second sequence of comparison voltage level, determining a digital value for the corresponding leakage current value of the selected block; and
determining, for each block of each of the plurality of groups of blocks, either a pass status or a fail status by, for each group of blocks:
comparing the digital value for the corresponding leakage current value of the selected block with the digital value for the corresponding reference current value of the group of blocks.

14. The method of claim 13, wherein, for each of the groups of blocks, the second sequence of digital values is a proper subset of the first sequence of digital values and is formed of a sequence of digital values between the digital value for the corresponding reference current value offset upward by a first number of the digital values and the digital value for the corresponding reference current value offset downward by a second number of the digital values, wherein the first number of digital values is a same for all of the groups of blocks and the second number of digital values is a same all of the groups of blocks.

15. The method of claim 13, further comprising:
storing, for each of the groups of blocks, the digital value for the corresponding reference current value of the group of blocks in a first register; and
storing, for each block of each of the groups of blocks, the digital value for the corresponding leakage current value in a second register,
wherein comparing the digital value for the corresponding leakage current value of the selected block with the digital value for the corresponding reference current value of the group of blocks comprises comparing a value stored in the first register with a value stored in the second register.

16. The method of claim 13, wherein the biasing circuit of the memory device includes a set of switches shared by the blocks of each group of the plurality of groups, but distinct from a set of switches shared by the blocks of each of the other groups of the plurality of groups.

17. A non-volatile memory system, comprising:
an array of non-volatile memory cells comprising a plurality of groups of blocks of non-volatile memory cells; and
one or more control circuits connected to the array, comprising:
biasing circuitry configured to selectively bias the blocks for memory operations, including testing for current leakage, including a separate set of switches for supplying voltage levels for each group of blocks;
built-in self-test circuitry, where to perform current leakage testing on the blocks, the built-in self-test circuitry is configured to:
determine, for a first block of each of a plurality of groups, a corresponding reference current value by:
with the biasing circuitry configured to perform a leakage test on, but while disconnected from the memory cells of, the first block, comparing a resultant current level with a first sequence of comparison voltage level each corresponding to one of a first sequence of digital values; and
based on the comparison of the resultant current level with the first sequence of comparison voltage level, determining a digital value for the corresponding reference current value of the group of blocks;
determine, for each block of each of the plurality of groups of blocks, a corresponding leakage current value by:
with the biasing circuitry connected to memory cells of, and configured to perform a leakage test on, said each block, comparing a resultant current level with a second sequence of comparison voltage level each corresponding to one of a second sequence of digital values; and
based on the comparison of the resultant current level with the second sequence of comparison voltage level, determining a digital value for the corresponding leakage current value of said each block; and
determine, for each block of each of the plurality of groups of blocks, either a pass status or a fail status by, for each group of blocks by:
comparing the digital value for the corresponding leakage current value of said each block with the digital value for the corresponding reference current value of the group of blocks.

18. The non-volatile memory system of claim 17, wherein, for each of the groups of blocks, the second sequence of digital values is a proper subset of the first sequence of digital values and is formed of a sequence of digital values between the digital value for the corresponding reference current value offset upward by a first number of the digital values and the digital value for the corresponding reference current value offset downward by a second number of the digital values, wherein the first number of digital values is the same for all of the groups of blocks and the second number of digital values is the same all of the groups of blocks.

19. The non-volatile memory system of claim 17, wherein the built-in self-test circuitry comprises:
- a first register;
- a second register; and
- a comparator, wherein the built-in self-test circuitry is further configured to:
- store, for each of the groups of blocks, the digital value for the corresponding reference current value of the group of blocks in a first register; and
- storing, for each block of each of the groups of blocks, the digital value for the corresponding leakage current value in a second register,
- wherein comparing the digital value for the corresponding leakage current value of said each block with the digital value for the corresponding reference current value of the group of blocks comprises comparing a value stored in the first register with a value stored in the second register.

20. The non-volatile memory system of claim 17, wherein:
- the array of non-volatile memory cells has a three dimensional NAND architecture in which NAND strings are formed along memory holes, each of the blocks comprises a plurality of word lines along which the memory cells, and where the leak test includes a test for word line leakage.

* * * * *